(12) United States Patent
Di Trapani

(10) Patent No.: US 10,161,596 B2
(45) Date of Patent: Dec. 25, 2018

(54) CHROMATIC MIRROR, CHROMATIC PANEL AND APPLICATIONS THEREOF

(71) Applicant: COELUX S.R.L., Lomazzo (CO) (IT)

(72) Inventor: Paolo Di Trapani, Cavallasca (IT)

(73) Assignee: CoeLux S.r.l., Como (IT)

( * ) Notice: Subject to any disclaimer, the term of this patent is extended or adjusted under 35 U.S.C. 154(b) by 0 days.

(21) Appl. No.: 15/310,306

(22) PCT Filed: May 13, 2014

(86) PCT No.: PCT/EP2014/059802
§ 371 (c)(1),
(2) Date: Apr. 13, 2017

(87) PCT Pub. No.: WO2015/172821
PCT Pub. Date: Nov. 19, 2015

(65) Prior Publication Data
US 2017/0146218 A1  May 25, 2017

(51) Int. Cl.
*F21V 1/00* (2006.01)
*F21V 13/08* (2006.01)
(Continued)

(52) U.S. Cl.
CPC ............ *F21V 13/08* (2013.01); *F21V 7/0008* (2013.01); *F21V 7/048* (2013.01); *F21V 7/06* (2013.01);
(Continued)

(58) Field of Classification Search
CPC .......... F21V 7/048; F21V 7/06; F21V 7/0008; F21V 7/22; F21V 13/08; G02B 5/0242; G02B 1/14; G02B 5/0278
(Continued)

(56) References Cited

U.S. PATENT DOCUMENTS

| 6,737,151 B1 | 5/2004 | Smith |
| 8,068,285 B1 | 11/2011 | Flynn |
| (Continued) |

FOREIGN PATENT DOCUMENTS

| DE | 4033545 A1 | 4/1992 |
| EP | 1179515 B1 | 5/2009 |
| (Continued) |

OTHER PUBLICATIONS

Jesper Serbin, European International Searching Authority, International Search Report and Written Opinion, counterpart PCT Application No. PCT/EP2014/059802, dated Mar. 25, 2015, 17 pages total.

(Continued)

*Primary Examiner* — Evan Dzierzynski
*Assistant Examiner* — Naomi M Wolford
(74) *Attorney, Agent, or Firm* — DiBerardino McGovern IP Group LLC

(57) ABSTRACT

Chromatic components are presented which alleviate the usage in various applications in that this chromatic component is, according to a first aspect of the present application, made-up of a mirroring surface and a diffusing layer in front of the mirroring surface, which preferentially scatters short-wavelength components of impinging light with respect to long-wavelength components of the impinging light, and in that according to another aspect, the chromatic component is made up of a stratified-glass panel which comprises two less sheets sandwiching an adhesive transparent polymeric film wherein the adhesive transparent polymeric film forms a diffusing layer which preferentially scatters short-wavelength components of light passing the stratified-glass panel with respect to long-wavelength components of this light with respect to long-wavelength components of the same.

44 Claims, 24 Drawing Sheets

(51) Int. Cl.
*F21V 7/22* (2018.01)
*G02B 5/02* (2006.01)
*G02B 1/14* (2015.01)
*F21V 7/06* (2006.01)
*F21V 7/04* (2006.01)
*F21V 7/00* (2006.01)

(52) U.S. Cl.
CPC ................ *F21V 7/22* (2013.01); *G02B 1/14* (2015.01); *G02B 5/0242* (2013.01); *G02B 5/0278* (2013.01)

(58) Field of Classification Search
USPC ........................................................ 362/241
See application file for complete search history.

(56) References Cited

U.S. PATENT DOCUMENTS

| | | |
|---|---|---|
| 2008/0285134 A1 | 11/2008 | Closset et al. |
| 2008/0302461 A1 | 12/2008 | Hayes et al. |
| 2011/0026257 A1 | 2/2011 | Holten et al. |
| 2011/0194270 A1* | 8/2011 | Di Trapani ............ G02B 6/001 362/2 |
| 2012/0080998 A1* | 4/2012 | Yu ......................... F21V 3/0481 313/483 |
| 2013/0039050 A1 | 2/2013 | Dau et al. |
| 2014/0133125 A1* | 5/2014 | Di Trapani ........... F21V 3/0463 362/2 |

FOREIGN PATENT DOCUMENTS

| | | |
|---|---|---|
| GB | 2450192 C | 12/2008 |
| WO | 2009156347 A1 | 12/2009 |
| WO | 2009156348 A1 | 12/2009 |
| WO | 2012014239 A1 | 2/2012 |
| WO | 2014058748 A1 | 4/2014 |
| WO | 2014076656 A1 | 5/2014 |

OTHER PUBLICATIONS

Friedhelm Fensterseifer, "Reflection Haze," BYK-Gardner Catalog, 2010/2011, pp. 27-28 (2 total pages).

T.C. Greenfell et al., "Representation of a non-spherical ice particle by a collection of independent spheres for scattering and absorption of radiation," Journal of Geophysical Research, vol. 104, No. D24, pp. 31, 697-31, 709 (13 total pages), Dec. 27, 1999.

* cited by examiner

CHROMATIC MIRROR, CHROMATIC PANEL AND APPLICATIONS THEREOF

The present application concerns chromatic mirrors and a chromatic panel.

Chromatic components are used in many applications. For example, with respect to chromatic lenses, the chromatic property is mostly a disturbing artifact. Sometimes, however, the chromatic property is a wanted property of the respective component. For example, in WO 2009156347 A1 an illumination device has been presented which uses a combination of a broadband artificial light source and a chromatic diffuser in order to illuminate, for example, indoor rooms so that the resulting scene including the interior of the room results in a more pleasant appearance in that the illumination appears to be less artificial and more natural, i.e. more similar to an illumination as it would result from an illumination in outdoor environments. The chromatic diffuser described therein simulates the Rayleigh scattering process sunlight experiences on its way down to earth.

However, it would be favorable to have other chromatic components at hand which ease the realizations of at least some application concepts, such as the one described in the just mentioned WO 2009156347 A1. For example, in use, the mentioned chromatic diffuser is capable of simulating the illumination of the sky and the sun inside an ambient. However, for this purpose a light source should be positioned beyond the diffuser, which requires the availability of a large free volume, e.g. several $m^3$, above the false ceiling, for example, if the illumination is arranged at the ceiling. Further limitations might arise from the material the diffuser is made of, in relation to mechanical resistance, fire-retardant properties, etc.

Accordingly, it is the object of the present application to provide such a chromatic component enabling an easier implementation of systems and concepts using such a chromatic component.

This object is achieved by the subject matter of the pending independent claims.

The present application is based on the idea that chromatic components may alleviate the usage in various applications if this chromatic component is, according to a first aspect of the present application, made-up of a mirroring surface and a diffusing layer in front of the mirroring surface, which preferentially scatters short-wavelength components of impinging light with respect to long-wavelength components of the impinging light, and if according to another aspect, the chromatic component is made up of a stratified-glass panel which comprises two glass sheets, e.g. a float glass or a tempered glass sheets, sandwiching an adhesive transparent polymeric film wherein the adhesive transparent polymeric film forms a diffusing layer which preferentially scatters short-wavelength components of light passing the stratified-glass panel with respect to long-wavelength components of this light with respect to long-wavelength components of the same.

In accordance with the first aspect, the underlying idea results in the combination of the reflective nature obtained by the mirroring surface, along with chromatic property achieved by the diffusing layer: in many applications, the light illuminating the chromatic component and the object to receive the chromatic component are easier to be located on the same side. With the chromatic mirror they may be positioned at the mirroring side of the mirror. For example, the object may be a room and the illuminator for illuminating the chromatic component, i.e. the chromatic mirror, is easier to be placed within the same room rather than external thereto. On the other hand, placing the diffusing layer for example immediately in front of the mirroring surface does not change the wanted chromatic property of the resulting chromatic component: light regularly reflected by the chromatic mirror maintains its initial solid-angle luminance profile with merely its spectrum being affected by the wavelength-selective scattering property of the diffusing layer, and that fraction of the impinging light which passes the diffusing layer twice, namely once when impinging onto the mirroring surface, and once when heading away from the mirroring surface, maintains its luminance profile despite the interposition of the mirroring surface because the same is diffuse, or widened compared to the regularly reflected light rays, anyway. In addition, the interposition of the mirroring surface, results in a virtual increase of the diffusing layer's thickness. Advantageously, this may help in reducing the size of the chromatic mirror in the thickness direction with respect to the size of the chromatic diffuser described in the introductory portion of the specification.

In accordance with the second aspect of the present application, the aim of alleviating the usage of a chromatic component is achieved by placing the diffusing layer in between two glass sheets to form a stratified-glass panel, wherein the diffusing layer concurrently assumes the role of an adhesive transparent polymeric film which fixes the two glass sheets to each other. By this measure, the diffusing layer is protected against atmospheric agents like UV light, dust, humidity and so on, which could change the chromatic and optical properties of the diffusing layers, the panel is strong enough in order to fulfill architectural requirements such as fire resistance, shock resistance, scratch resistance and the like, and the chromatic panel thus constructed may alternatively be extended to form a chromatic mirror by further depositing a mirroring layer on the chromatic component.

Advantageous implementations and systems using the chromatic components are the subject of the dependent claims.

Advantageous embodiments of the present application are described with respect to the figures, among which FIG. 1 shows a schematic three-dimensional view of a chromatic mirror according to an embodiment;

FIG. 5b shows schematically the angular luminance profile of the illuminator of FIG. 5a;

FIG. 6b shows a light concentrator with respect to another embodiment.

In the following, embodiments of the present application are set forth with respect to the figures. In order to ease the understanding of the concepts underlying these embodiments, a general embodiment of a chromatic mirror is discussed first with respect to FIG. 1, and then some applications and systems using such a chromatic mirror are presented, followed by examples for producing such a chromatic mirror resulting in respective products in the form of which such a chromatic mirror may be distributed or handled. Later on, another chromatic component namely a chromatic panel, is presented along with possible applications and systems using the same.

Figure 1:
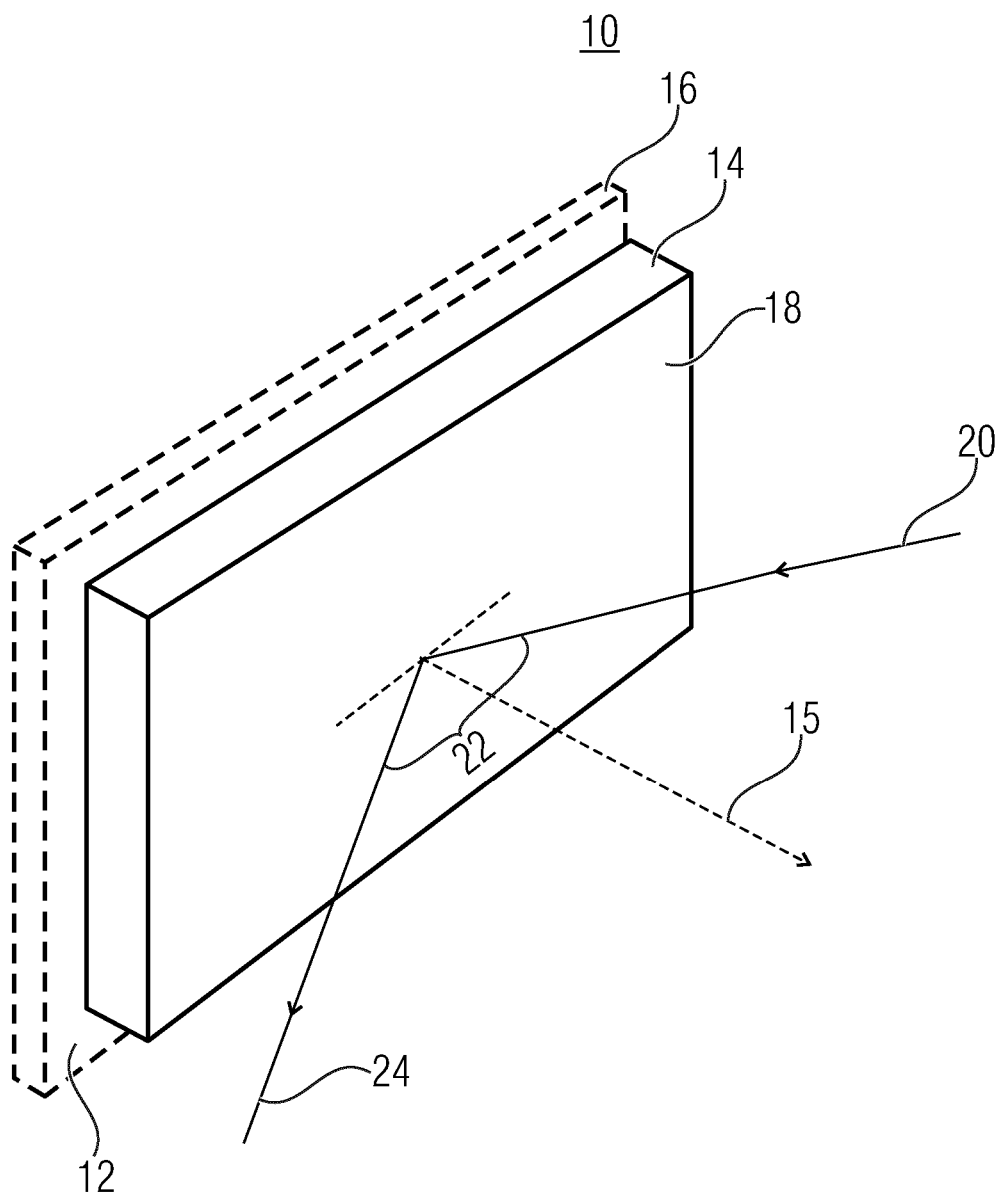

FIG. 1 shows a chromatic mirror according to an embodiment. The chromatic mirror is indicated using reference sign 10 and comprises a mirroring surface 12 and a diffusing layer 14 in front of the mirroring surface 12. The direction into which the mirroring side of mirror 10 faces is denoted 15.

Figure 2:
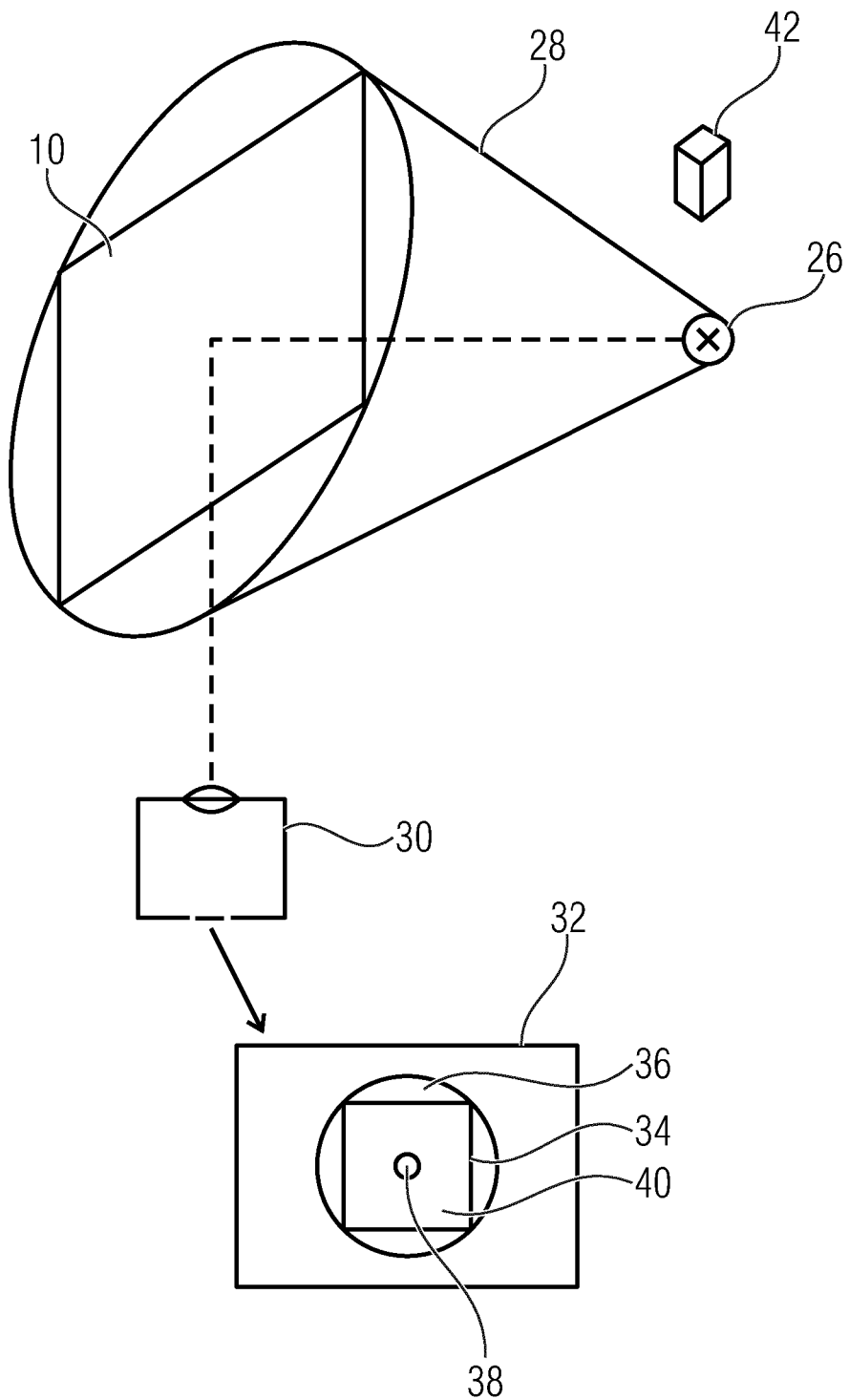
FIG. 2 shows an example for a concept and system for illumination using the chromatic mirror in accordance with an embodiment.

It should be noted that FIG. 1 is to be treated as a schematic representation of the chromatic mirror 10 only, and accordingly although FIG. 1 illustrates the chromatic mirror 10 as flat panel shaped, the mirroring surface 12 may, for example, be shaped in a non-flat manner such as, for example, concavely shaped, instead of the planar configuration shown in FIG. 1. Likewise, although FIG. 1 illustrates the mirroring surface 12 as a main side of a flat work, piece or layer 16, facing the diffusing layer 14, with work piece or layer 16 laterally extending beyond the lateral circumference of layer 14, this concept has been chosen for illustration purposes only and may not be interpreted as a restriction of the embodiment of FIG. 1. Similar statements are also true with respect to the thicknesses illustrated in FIG. 1. Further, as will be shown in the following embodiments, the mirroring surface 12 may, for example, be formed by coatings or films or panels, and layers 14 and 16 may immediately contact each other as illustrated in FIG. 2, or one or more layers may be positioned therebetween. For example, the mirroring surface 12 may be formed by a coating or film on work piece or layer 16, and the diffusing layer 14 may be a film or coating deposited onto mirroring surface 16 either directly or via one or more further layers. Even in that case, the chromatic mirror 10 may be formed as a multi-layered component as illustrated in FIG. 1, or the work piece or layer 16 may be formed as a voluminous structure or object on the outer surface of which the mirroring surface 12 is formed. As will also become clear from the embodiments outlined below, the chromatic mirror 10 may be stiff or tensile or flexible. Any component of the chromatic mirror 10 may serve as a supporting member such as the reflective member 16, the side facing the diffusing layer 14 of which forms the mirroring surface 12, the diffusing layer 14 or some other layer positioned between mirroring surface 12 and diffusing layer 14 or positioned on the other side of diffusing layer 14, i.e. to the main side 18 of diffusing layer 14 facing away from mirroring surface 12. This supporting member may then lend the stiffness, tensibility or flexibility to chromatic mirror 10. Whatever shape the mirroring surface 12 actually has, the diffusing layer 14 is a layer which substantially conforms to the shape of the mirror surface 12 and may have, as described below, a substantially even thickness across the mirroring surface's 12 lateral extension.

For the moment, any specific description of possibilities of implementing and realizing mirror 10 shall be deferred, while describing now the combined action and function of the mirroring surface 12 having the diffusing layer 14 positioned in front thereof.

The diffusing layer 14 is constructed so as to preferentially scatter short-wavelength components of impinging light 20 with respect to long-wavelength components of the Impinging light 20. Alternatively speaking, layer 14 lets pass long-wavelength components of the impinging light 20 without scattering at a higher probability than compared to short-wavelength components of the impinging light 20. In even other words, the diffusing layer 14 has a scattering cross-section for impinging light 20, which increases within the visible light spectrum from long to short wavelengths. The increase may be a monotonic increase. The way how scattered light propagates may, for example, be substantially isotropic, i.e. featuring equal intensity for all the direction, or a weak dependence of the scattered light's intensity on the scattered light's direction, i.e. the scattered light is diffuse. In the end, this means that the portion of the impinging light 20 which is regularly reflected at the mirroring surface 12 without any scattering interaction with the diffusing layer 14 within the section 22 of the light path leading within diffusing layer 14, indicated by reference sign 24 in FIG. 1, has a spectrum which differs from the spectrum of the impinging light 20 in that the center of mass of the portion of the spectrum, lying within the visible region, is shifted towards longer wavelengths. Besides the light 24, regularly reflected by chromatic mirror 10, another portion of the impinging light 20 is subject to the just mentioned scattering by diffusing layer 14 and exits diffusing layer 14 in a diffuse manner, i.e. leading to substantially constant luminance along all the directions pointing towards the hemisphere to which direction 15 points, or at least a luminance which does not change by more than a factor 3 within a cone of at least 30°, preferably 45°, most preferably 60° HWHM aperture around the direction of specular reflection. As far as the spectrum of the just mentioned diffusely reflected light is concerned, same substantially corresponds to a spectral weighting of the spectrum of the inbound impinging light 20 with the aforementioned scattering cross-section or, in other terms, the spectrum of the scattered diffuse light substantially corresponds to a difference between the spectrum of the inbound impinging light 20 and the regularly reflected light 24.

It is worthwhile to note that, as a consequence of the just outlined behavior of mirror 10, light being emitted by mirror 10 as a consequence of its illumination at a certain direction such as the direction indicated at 24 in FIG. 1, is a superposition or sum of the light 1) impinging onto mirror 10 at the specular angle and having been regularly reflected by mirror 10, i.e. light 20, into that direction 24, and 2) the diffuse light generated by scattering processes with light impinging onto mirror 10 from any direction and being scattered, accidentally, towards direction 24, i.e. all light impinging onto mirror 10 contributes to the latter diffuse light, irrespective of the direction at which the light impinges onto mirror 10.

A chromatic mirror as outlined with respect to FIG. 1 might be used, for example, within a framework shown in FIG. 2, which in the end also shows a system in accordance with an embodiment comprising a combination of a chromatic mirror 10 and an illuminator 26 for Illuminating chromatic mirror 10. The illuminator 26 is, for example, a white light source. The illuminator 26 according to FIG. 2 emits or casts light onto mirror 10. In FIG. 2 a light cone of the light emitted by illuminator 26 is exemplarily shown to completely cover and substantially match the extension of mirror 10. That is, the area of a cross-section of light cone 28 at the plane within which mirror 10 extends may, for example, be smaller than three times the area of mirror 10. Further, the illuminator 26 obliquely illuminates mirror 10, i.e. mirror 10 is exemplarily shown as being flat shaped, and a projection of illuminator 26 onto the mirrors 10 plane is offset to a mid of mirror 10 by, for example, more than 50% of the square root of the area of mirror 10.

With this configuration, FIG. 2 illustrates this scene which results when looking at mirror 10 at a specular angle with respect illuminator 26. To this end, FIG. 2 illustrates an eye or camera 13 as being positioned at the specular angle relative to illuminator 26 with respect to mirror 10. The picture which results in camera/eye 30 (e.g. the image sensor or the retina) is illustrated in FIG. 2 at 32: the outline of mirror 10 is visible, i.e. 34, and surrounding the same, portions 36 of a wall are seen, which is exemplarily assumed to surround mirror 10 and lit by cone 28. Within mirror 10, a spot 38 is visible which results from the regularly reflected light portion of the light emitted by illuminator 26 and has a warmer light (lower CCT) than compared to the white light of illuminator 26. Spot 38 is surrounded by a uniform area 40 of light being of higher CCT (correlated color temperature) than compared to the CCT of spot 38 (and compared to the CCT of the light of illuminator 26). The surrounding light 40 primarily stems from the diffused light generated by the scattering within diffusing layer 14, and the dependency of this diffuse scattering is responsible for the increase in CCT relative to light 38. The light of the surrounding scene area 40 is, for example, bluish. It is superimposed, however, by light impinging onto mirror 10 at some other angle than compared to the light output by illuminator 26, and being regularly reflected by mirror 14. Such light may stem, for example, from other objects within the room, with this other light travelling along paths, for example, past illuminator 26. FIG. 2, for example, shows an object 42 positioned nearby illuminator 26 positioned such that the virtual image of this object 42 would be visible by camera 30. As illustrated in FIG. 2, the object 42 is, for example, not directly lit by illuminator 26. Naturally, however, due to light reflections at other objects not shown in FIG. 2, such as other walls or the like, object 42 may cause light to impinge onto mirror 10. The latter light may disturb the uniformity of the diffuse light generated by diffusing layer 14 responsive to the illumination by illuminator 26. However, preferably, the diffuse light overwhelms the regularly reflected light from object 42 such that the object 42 is not visible for the observer 30, or at least, the observer's attention is not drawn to this object. For example, imagine that observer 30 would denote an observer's eye and that the observer, owing to the sky-sun-like scene visible within mirror 10, sets the eye to look at infinity. In that case, it may occur that owing to the overlay with the diffuse light, the observer does not "see" object 42 and retains an impression as if he or she would look into a window seeing bluish light 40 surrounding a sun-like spot 38 with experiencing an infinity depth impression. Interestingly, the illuminator 26 also resides within the same room as the observer 30.

Summarizing the above, FIG. 2 shows that a chromatic mirror 10 according to FIG. 1 may be combined with an illuminator or light source 26 for illuminating the chromatic mirror 10 so as to form a system for illumination. The system 10 may, for example, be a system for illuminating an interior room of a building. In that case, the mirror may, for example, be fixed to a wall 44 or a ceiling 46 of a room 48 as illustratively depicted in FIG. 3. As already described with respect to FIG. 2, the illuminator 26 may be positioned within the same room or in a wall, the ceiling 46 or the floor thereof.

As far as the illuminator 26 is concerned, it should be noted that same may comprise a light concentrator in order to concentrate otherwise divergently generated light of the Illuminator 26 so as to form the light cone 28, which in turn is directed towards mirror 10 so as to illuminate mirror 10. Certain measures may be taken in order to achieve a uniform illumination of mirror 10 by illuminator 26, as for example the use of compound parabolic concentrators (CPCs), light beam homogenizers (fly eyes, tandem arrays, etc.), as well as to obtain the formation of a light spot which matches the shape of the mirror, for example a rectangular, or an elliptic shape.

Although it has not yet been noted above, it should be mentioned that the diffusing layer 14 may preferably be configured such that same does not, or substantially does not, absorb light. In that case, all of the light produced by illuminator 26 is conserved for the sake of illumination. Further, although not mentioned previously, the diffusing layer may have such a wavelength-dependency in scattering cross-section that the diffusing layer scatters light in a Rayleigh or at least a Rayleigh-like regime. In that case, a just-outlined sun-sky-appearance effect is increased as the sky also predominately scatters light in the Rayleigh regime. The sun-sky-appearance, however, contributes in an higher probability that an observer looking onto mirror 10 in the specular angle relative to illuminator 26 gains an infinity depth impression so that the eyes of the observer are less likely attracted by edges in the sky-like region 40 which result from objects in the vicinity of mirror 10 other than illuminator 26, such as 42 in FIG. 2.

That is, observer 30, when looking onto mirror from some specular view angle, may gain a feeling as if he/she looks into the sky 40 through a window formed by mirror 10, with concurrently seeing the sun 38 surrounded by the sky 40 through this window. It should be noted that, when looking onto mirror from some non-specular view angle, merely the light 40 is visible for the observer so that the observer may gain a feeling as if he/she looks into the sky through a window formed by mirror 10, without seeing the sun therethrough.

Preferably, the combined action of the mirroring surface 12 and the diffusing layer 14 produces a haze in reflection which is greater than 10%, more preferably greater than 20%, and even more preferably greater than 30%, for impinging blue light at 450 nm. The "haze in reflection" denotes the above outlined portion of the impinging light which is effected by the scattering by diffusing layer 14, i.e. the scattered diffuse light. In other terms, the combined action of the mirroring surface 12 and the diffusing layer 14 may be set such that a combined action produces a haze in reflection which is at least two times lower for an impinging red light at 650 nm than for an impinging blue light at 450 nm. As outlined above, this is owing to the spectral dependency of the scattering cross-section of the diffusing layer 14.

Figure 4:
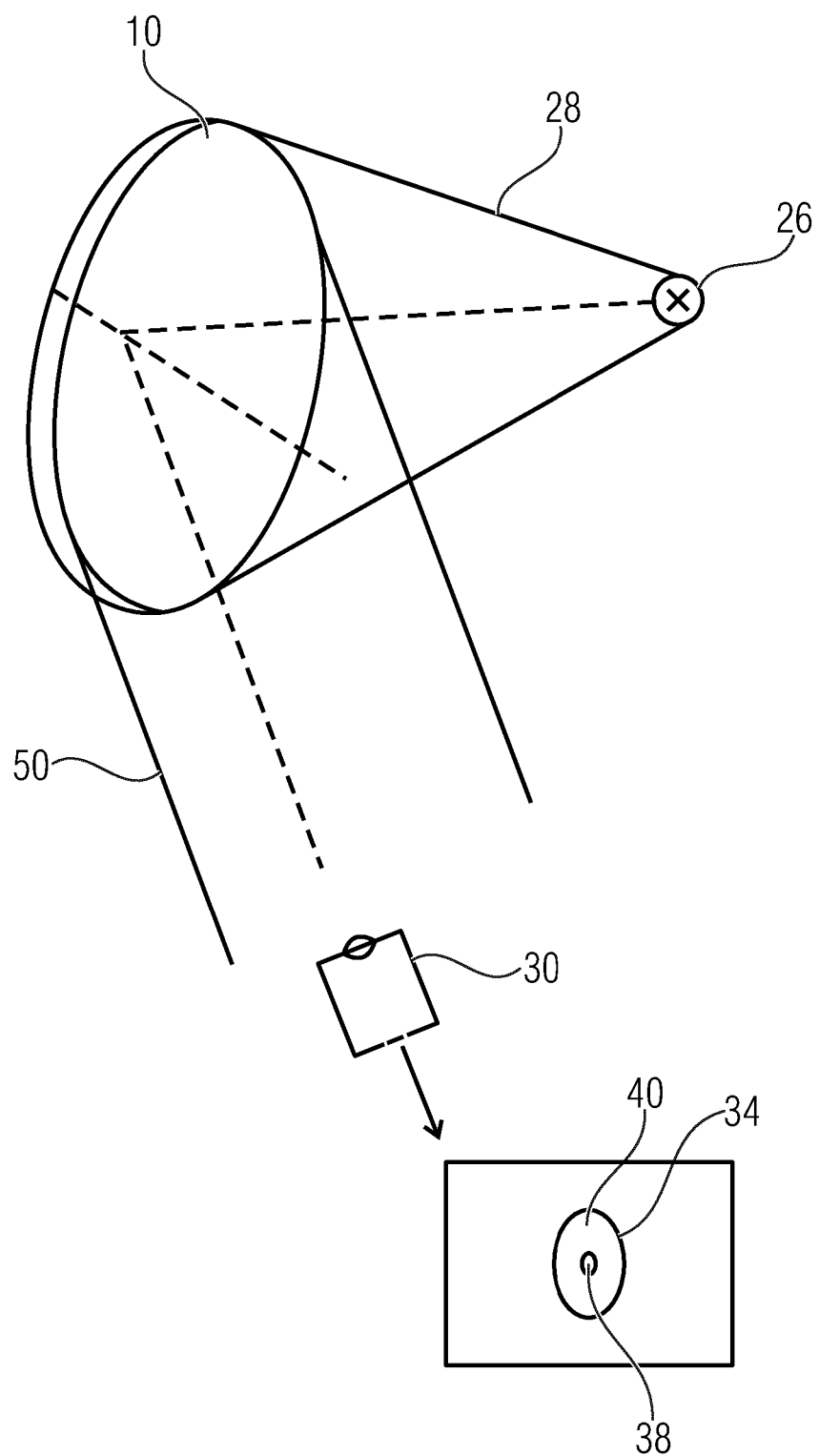
FIG. 4 shows a schematic diagram of a modification of the embodiment of FIG. 2 according to which a concave chromatic mirror is used.

In the embodiment outlined with respect to FIG. 2, the just outlined infinity depth impression resulting for an observer which sees the virtual image of the illuminator 26 at infinity, is disturbed by the fact that illuminator 26 is in fact arranged at a finite distance to a mirror 10. For example, optical cues such as the eyes' binocular convergence, the parallax of the illuminator 26, and the accommodation of the observers' eyes onto, for example, structural details of the illuminator 26 may distract the observer 30 from assuming this infinity depth impression. In order to alleviate this problem, FIG. 4 shows, differing from the previously illustrated embodiments, that the mirror's 10 mirroring surface may be concavely shaped, such as having a concavely parabolic shape. In particular, FIG. 4 amends the embodiment of FIG. 2 in this regard and accordingly, ends-up in a system for illumination, where the illuminator 26 is positioned, for example, at a focus point of the chromatic mirror so that the light from the illuminator 26 which is regularly reflected by chromatic mirror 10 is parallelized, and the light cone 28 results, as far as its regularly reflected portion is concerned, in a parallel light stream 50 or a low-divergence light stream 50. The obliqueness of illuminator 26 with respect to mirror 10 is maintained and translates into the fact that, for example, the chromatic mirror 10 is formed as an off-axis section of a rotational paraboloid such as a portion of a rotational parabolid which does not even contain the vertex, while keeping the light source 26 at or close to the focal point. In so doing, a collimated beam of regularly reflected rays can be obtained without having the light source in the beam path, as for the case of an on-axis lay out. However, for certain applications, the on-axis layout can be used too.

Shaping the mirroring surface of mirror 10 in the manner outlined above with respect to FIG. 4 contributes to increasing the likelihood that an observer looking into the direction of mirror 10 and seeing, via mirror 10, illuminator 26, i.e. sees sun 38 and sky 40, gains the just outlined infinity-depth feeling and feels as if he saw a lower CCT bright object 38, e.g. the sun, at infinity surrounded by a sky-like atmosphere 40. This is because the virtual image of the illuminator 26 as seen through mirror 10 is now in fact at infinity so that the binocular as well as the accommodation cues fit to the sky-sun-appearance, and possible distractions from the infinity depth impression my merely stem from visible edges of objects mirrored into the observer's field of view with the surrounding sky area 40.

It may be preferred if the chromatic mirror 10 is made sufficiently wide. For example, the mirroring surface may be constructed such that a focal length thereof is smaller than a square root of the mirroring surface's 12 area or even smaller than 1.5 times the just mentioned square root of the mirroring surface's area.

As will become clear from the embodiment described further below, it is not necessary that the concave shape of mirror 10 of FIG. 4 has rotational symmetry or is a portion of a rotationally symmetric surface, i.e. has a focal length equal for all translatory directions. Rather, mirror 10 may be formed like a parabolic concave cylindrical mirror, or have another concave shape along one lateral or translatory direction, hereinafter referred as y direction, and be flat or plane, i.e. have infinity focal length, along the other orthogonal lateral or translatory direction, hereinafter referred as x direction. As it will be clarified here below, in spite of the fact that the cylindrical mirror can collimate the light rays of the illuminator 26 only in the plane orthogonal to the x direction, solutions exist which guarantee the perception of the illuminator at infinite distance from the observer.

Figure 5A:
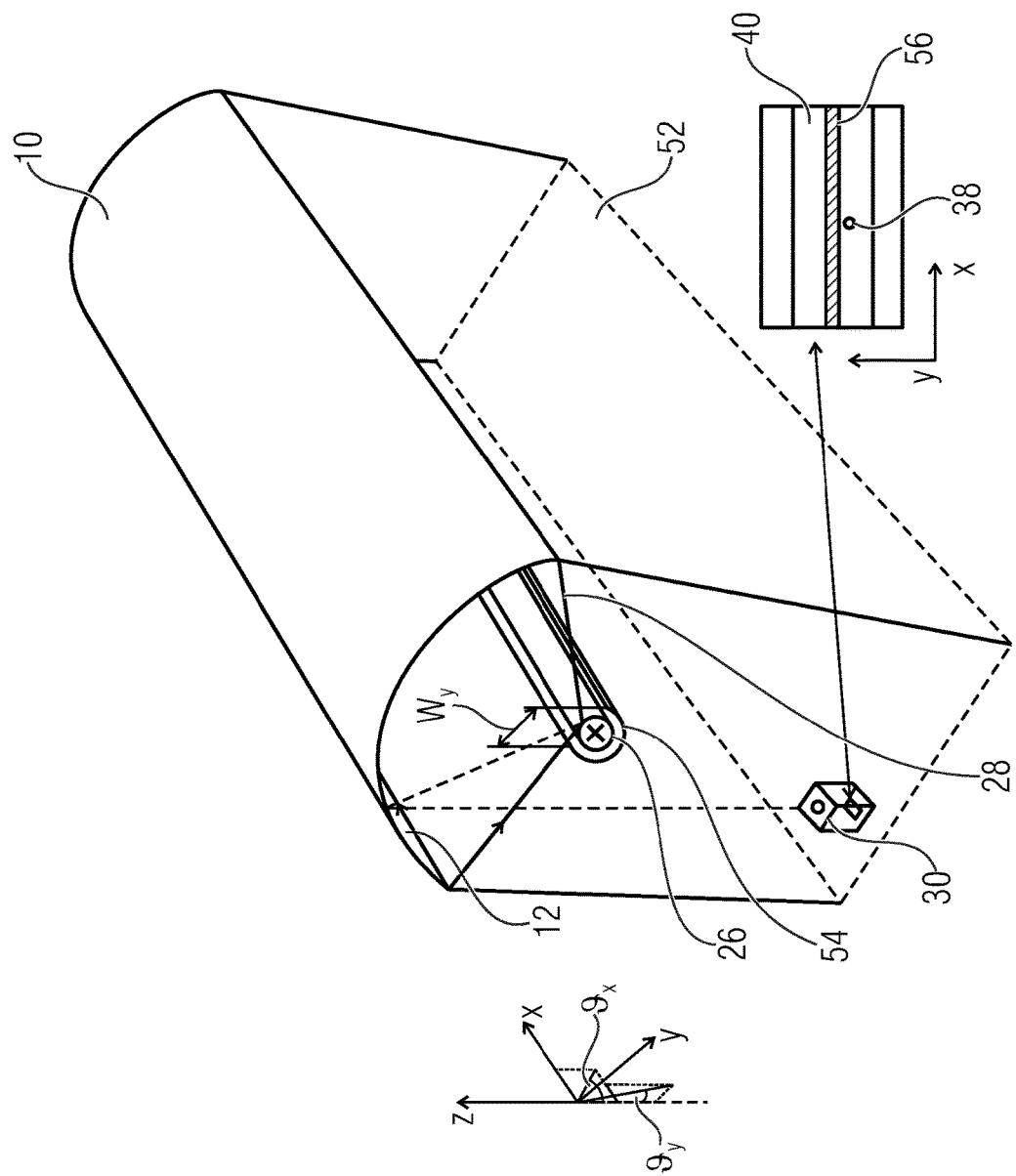
FIG. 5a shows a three-dimensional view of a usage of a elongated, or cylindric concavely shaped, chromatic mirror within a concept or system for illumination in accordance with a further embodiment.

Such a configuration is illustrated with respect to FIG. 5a. FIG. 5a shows mirror 10 with its mirroring surface 12 having a concave or parabolic shape in the plane perpendicular to the x direction, i.e. within a projection onto a zy-plane, and being linearly shaped or straight along an x-axis. In other terms, said cylindrical-mirror surface is obtained by translating a concave or parabolic curve laying onto a zy plane along the x direction. Thus, mirror 10 is shown as a concave cylindric mirror having a focal line extending parallel to the x axis. A linear illuminator 26 is positioned parallel to the x-axis, at the focal line of mirror 10, in order to more or less completely illuminate mirror 10. Frankly speaking, FIG. 5 represents a modification of the system of FIG. 4 according to which, for example, the portion of the room directly illuminated by the regularly reflected portion of the light of illuminator 26 has an elongated shape, such as a rectangular shape 52 as illustrated in FIG. 5. As far as the zy-plane is concerned, the situation in FIG. 5a is quite the same as the one outlined with respect to FIG. 4: The light emitted by illuminator 26 is divergent, but is parallelized by mirror 10 along a direct light direction at least as far as the regularly reflected portion of the light is concerned which impinges onto mirror 10 from illuminator 26.

More specifically, from basic optics it follows that the luminance angular profile of the regularly reflected light portion, $L_R$, as far as the dependency on the angle $\theta_y$ is concerned, may fulfill the following formula;

$$fwhm_y \stackrel{def}{=} FWHM\{L_R(\vartheta_y)\} \approx q*2*\arctan\left[\frac{w_y}{2f}\right],$$

wherein
$w_y$ is the width of the illuminator 26 along the y axis,
f is the focal length of mirror 10 relative to the mirror curvature in the zy plane,
$\theta_y$ is the angle of a direction in the zy plane with respect to the direct light direction, i.e. z, and
q is a qualify factor which has a value d=1 in an ideal system, and which here is assumed to preferably fulfill 1≤d≤3, more preferably 1≤d≤2, even more preferably 1≤d≤1.5 and wherein the formula is valid for any position, x,y, and for any angular direction in the xz plane, $\theta_x$, for which the luminance $L_R(x, y, \theta_x, \theta_y)$ is larger than 10% of the maximum luminance value. In summary, the formula above simply says that the system for illumination is arranged to collimate the light in the yz plane with a precision no more than preferably 3, more preferably 2, even more preferably 1.5 far from the optical limit for the case of a Lambertian emitter of width $w_y$.

However, things are different as far as the xz plane is concerned. Within this plane, the light emitted by illuminator 26 and regularly reflected by mirror 10 retains its divergence stemming from the illuminator 26. Accordingly, illuminator 26 is, as shown in FIG. 5a, especially configured to show 1) a fairly low divergence in the xz plane. More precisely, given $\theta_x$ as the angle of a direction in the zx plane with respect the z axis, the illuminator 26 is configured to produce a luminance angular profile, $L(\theta_x)$, having a width which matches the width of the reflected luminance $L_R(\theta_y)$ in the orthogonal direction. With reference to the FWHM of said luminance angular profiles, the concept becomes:

$fwhm_x \stackrel{def}{=} FWHM\{L(\theta_x)\} \approx fwhm_y$ wherein the formula is valid for any position, x,y and for any angular direction in the yz plane, $\theta_y$, for which the luminance $L(x, y, \theta_x, \theta_y)$ is larger than 10% of the maximum luminance value. In order to obtain this result, the illuminator divergence in the xz plane should be tailored according to the actual values of the illuminators width, $w_y$, of mirror 10 focal length, f, and on quality factor, q. Beyond that, the luminance profile should be 2) substantially independent, i.e. uniform, as far as the dependency on x coordinate is concerned, i.e. $L_{x=x_1}(\theta_x, \theta_y) = L_{x=x_2}(\theta_x, \theta_y)$ for any pair of different points along axis x.

The uniformity, however, may merely be fulfilled at a granularity corresponding to the angular resolution of the observer's eyes, that is, for any integrals of the luminance over x within two different regions of, for example, 10 mm². How this may be achieved is illustrated later with respect to FIGS. 6a and 6b. However, before this, firstly, the special thoughts relating to the luminance profile of the illuminator 26 of FIG. 5a so as to address the cylindrical shape of mirror 10 is explained in more detail and, secondly, the functionality and appearance of the illumination generated by the system of FIG. 5a shall be explained.

Figure 5B:
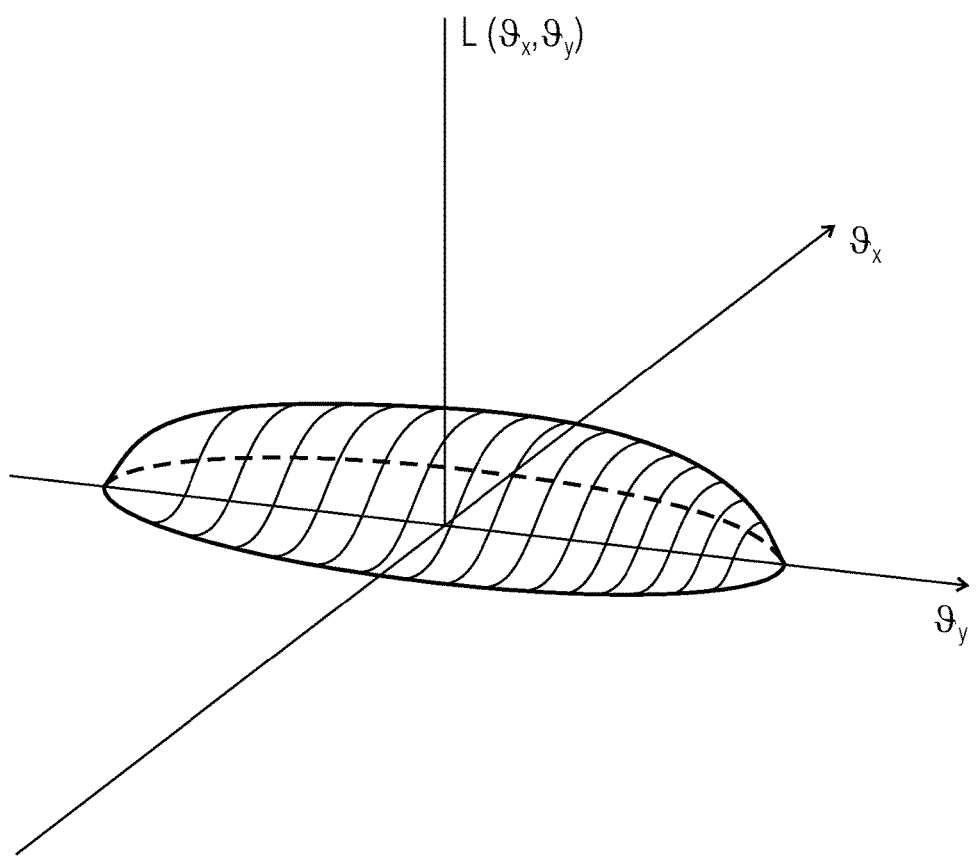
Figure 5C:
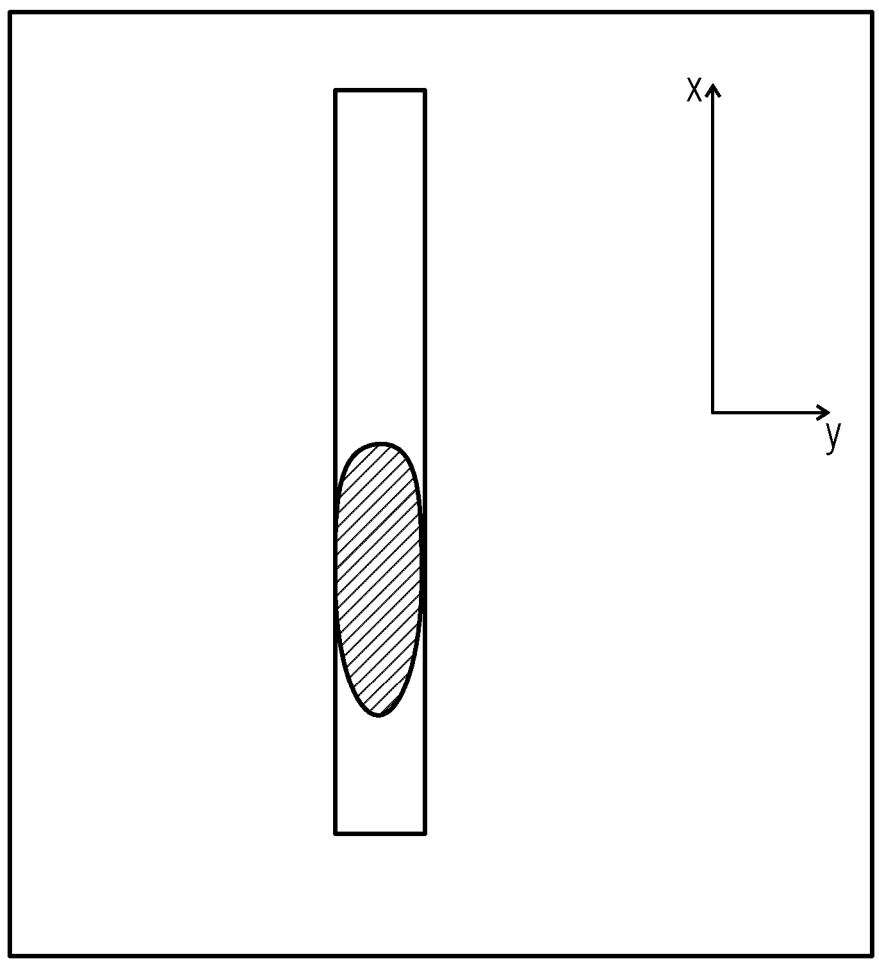
FIG. 5c shows schematically the appearance of the illuminator of FIG. 6a when directly looking onto illuminator of FIG. 5a from the direction of the mirror.

The linear illuminator 26 is characterized by its luminance profile, $L(x, y, \theta_x, \theta_y)$, wherein the luminance is defined as the luminous flux in a beam, emanating from a surface, in a given direction, per unit of projected area of the surface as viewed from that direction, per unit solid angle (ASTM, E 284-09a, Standard Terminology of Appearance) and wherein $\theta_x, \theta_y$ are the directions as measured in the z,x and in the z,y planes, respectively. With this respect, the linear illuminator 26 is configured to have a luminance which substantially does not depend on the x coordinate, i.e. which is uniform along the x direction, and which is typically not isotropic for what concerns the angular dependence (it can be isotropic in some exceptional case), in the sense that said luminance generally depends weakly on $\theta_y$, while it shows a narrow peak with respect to its dependence on $\theta_x$. For example, said luminance angular profile has a FWHM (full width at half maximum) larger than 60°, preferably larger than 90°, most preferably larger than 120° with respect to the dependence on $\theta_y$, $L(\theta_y)$, and has a FWHM smaller than 45°, preferably smaller than 30°, most preferably smaller than 15° with respect to the dependence on $\theta_x$, $L(\theta_x)$, as schematically depicted in FIG. 5b.

Imagine briefly, an observer was looking directly onto illuminator 26 (i.e. in FIG. 5a from the view point of the mirror downwards). That is, the observer would be positioned in front of the linear illuminator 26 at a certain distance from the illuminator, e.g. 1 m, looking directly into the center of the linear illuminator 26 from a direction $\theta_x=\theta_y=0°$. In this circumstance, he/she would see a bright spot under angular aperture $\Delta\theta_y$ which is limited by the angular width of the illuminator, in the y direction (for example $\Delta\theta_y=3°$ for a width of ~5 cm of the illuminator for the given 1 m distance), and which is limited by the FWHM of the $L(\theta_x)$ luminance angular profile, in the x direction, i.e. $\Delta\theta_x=fwhm_x$, assuming the linear illuminator being fairly long (e.g. several m) in the x direction. In other terms, an observer looking directly into the source when it is on may perceive a flashed area or a luminous spot which, for a typical observation distance, is strongly elongated in the x direction. For example, the observer may perceive the source flashed area under an angle $\Delta\sigma_x=10°$, or less. An example of the appearance of the linear illuminator 26 and the flashed area as seen by an observer directly looking into the source is given in FIG. 5c. In what follows, it is assumed that the linear illuminator is configured so that only the flashed area is perceived by an observer which is looking into the source.

Figure 5D:
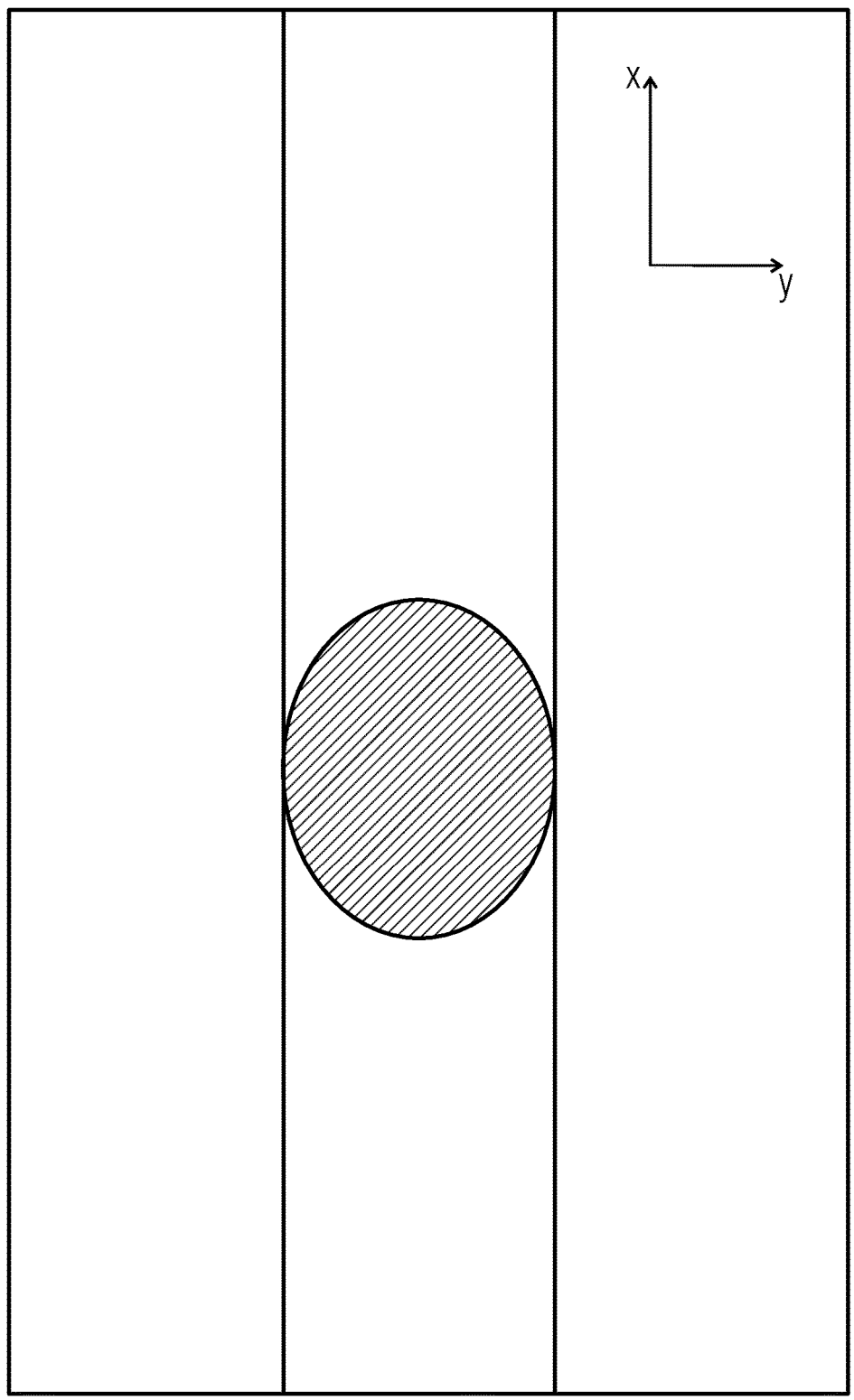
FIG. 5d shows schematically the appearance of the illuminator of FIG. 5a when looking, from an on-axis position, onto illuminator of FIG. 5a via reflection by the mirror.

FIG. 5d shows the appearance of the linear illuminator 26 and its flashed area as seen by an observer who looks at said illuminator 26 via the reflection of the cylindric parabolic chromatic mirror 10, i.e. by an observer positioned within the regularly reflected light beam. Owing to the fact that the linear illuminator 26 is positioned in the focus line of the parabolic mirror 10, the image of the linear illuminator may be magnified along the y direction, yore precisely, the angular width $\Delta\theta_y'$ under which the observer seas the flashed area does not depend on the observer-source distance anymore, as described with repsect to FIG. 5c, but only on the width of the source in the y direction and on the focal length of the parabolic mirror. For example, a focal length of ~30 cm leads, in the idea condition, the observer to perceive the flashed area under an angle $\Delta\theta_y' \sim 10°$, for a ~5 cm width linear illuminator. In contrast, the angular width under which the observer perceives the flashed area in the orthogonal, z,x, plane is not modified by the presence of the cylindric parabolic chromatic mirror 10, since the mirror has infinite focal length in the z,x plane, leading therefore to $\Delta\theta_x'=\Delta\theta_x=10°$. This means that, for any observatory-source distance, and for a give source width in the y direction and source Luminance profile, the condition of substantially isotropic or at least not-elongated appearance of the source flashed area, i.e. the condition $\Delta\theta_x'=\Delta\theta_y'$, can be met by properly choosing the parabolic mirror focal length. Therefore the present invention allows to produce the appearance of a sun image equally wide along y and x direction having an illumination device which may have an arbitrarily large length in the x direction.

It is worth noticing that the observer looking at the linear illuminator 26 via the reflection of the cylindric parabolic chromatic mirror 10 will perceived the flashed area or the source, i.e. the flashed spot, at virtually infinite distance. In fact, for what concerns the perception related to the light ray distribution in the y,z plane, the fact that the source is in the focal position automatically ensures the perception of a source virtual position at the infinity. For what concerns the perception related to the light ray distribution in the orthogonal plane, it was noticed by the iventors of present application that the observer perceives the flashed spot at infinite distance as well. This evidence follows by the chosen luminance source profile, and specifically by the mot that said luminance does not depend on the x coordinate, i.e. it is uniform along the x direction. As a consequence, the observer eye cues, e.g. the binocular parallax, the motion parallax, and the accomodation cue, do not find any support for inducing the observer to converge or accommodate her/his eyes at the physical plane where the illuminator is located, this action being in conflict with the eye convergence/accommodation at infinity supported by the virtual image of the flashed spot as perceived in the orthogonal plane. Additionally, the presence of a uniform, blue, luminous light background, which is created by the contribution of the light scattered by the chromatic, parabolic mirror 10, e.g. the light scattered in the Rayleigh regime, further contribute in inducing the observer to set his sight at the infinity, due to the so called "aerel perspective" cue, i.e. the eye cue by which the distance of an object from the observer is perceived to increase with the increase of bluish haze, this bluish haze being normally due to the amount of air interposed between the object and the observer, which in turn is proportional to the object observer distance.

Summarizing, all the above mentioned factors, i.e. the focusing power in the y,z plane, the anisotropic angular luminance profile of the illuminator, the uniformity of said angular profile in the x direction, the fact that the chromatic mirror 10 has a cylindrical parabolic shape and that the linear illuminator 26 is positioned at the mirror focal line and, last but not least, the capability of the chromatic mirror 10 of scattering the short wavelength of the Impinging light, concurrently contribute in creating the appearance of a blue sky and a bright sun spot at infinite distance, wherein the size of the produced sky window along the x direction can be made arbitrarily large, differently from rotational symmetric mirrors, for which the size of the produce sky cannot be larger than a few focal lengths.

Thus, the system of FIG. 5a could, for example, be installed in a ceiling of a room, thereby Illuminating a rectangular area 52 on the floor by way of the regularly reflected low-divergence direct light portion of the light generated by illuminator 26, while other portions of the room are also illuminated by way of the diffuse light caused by the scattering within the diffusing layer of mirror 10. As described with respect to FIG. 4, any light which could directly illuminate the room, i.e. is not directed onto mirror 10, could, optionally, be blocked by a light blocker or a light concentrator which is schematically indicated in FIG. 5a using reference sign 54 as a concavely shaped cylinder arranged on the other side of illuminator 26 relative to mirror 10 so as to prevent any light of illuminator 26, which is not directed onto mirror 10, i.e. heads downwards, so as to not directly illuminate the room.

FIG. 5a illustrates a layout which ensures the effect of above. By way of the schematically indicated camera or observer eye 30, FIG. 5a illustrates the appearance of the illumination system of FIG. 5a when an observer looks onto mirror 10 in a manner so that his/her eyes 30 are directly hit by the regularly reflected light of illuminator 26, hut the observers eyes 30 are offset from the zx plane, i.e. the eye is underneath the projection of mirror 10 onto directly lit portion 52, but at a fraction thereof offset from the projection of illuminator 26 onto area 52. That is, the bright disc 38 moves, as far as x and y coordinates are concerned, i.e. the plane perpendicular to the direct light direction, along with the observers' eyes 30, in the same speed as th latter, just as the sun does relative to a window's frame when seen therethrough. That is, the observer would, for example, look upward onto the ceiling where the mirror 10 and the illuminator 26 are, standing within area 52. Due to the elongated shape of mirror 10, he/she would see an elongated bluish, i.e. higher CCT, background light portion 40 within which, along the elongated direction, the backside of light blocker 54 is visible as indicated by the dashed portion 56. However, directly above him/her (in the direct light direction, here parallel to z, i.e. at angles $\theta_y$ and $\theta_x$ equal to zero), the observer sees the bright, lower CCT spot 38 resulting from the low divergence regularly reflected light, the low divergence along the x-axis stemming, as just mentioned, from the specific design of illuminator 26, while the low divergence along the y-axis stems from the concave/parabolic shape of mirror 10.

Summarizing, in FIG. 5a, the illuminator 26 and the chromatic mirror 10 are formed in an elongated manner along an elongation axis x wherein the mirror 10 is concavely shaped in a plane perpendicular to the elongation axis x, wherein the illuminator 26 has a luminance profile which is divergent, i.e. wide, such as having a FWHM as great as, or even greater than, the angular width of mirror 10 when seen from illuminator 26, as far as the luminance profile's dependency on the first angle $\theta_y$ is concerned, and substantially uniform as far as the luminance profile's dependency on x, and substantially collimated i.e. narrow such as having a FWHM smaller than three times the FWHM pertaining $\theta_y$, as far as the luminance profile's dependency on $\theta_x$ is concerned. FWHM pertaining $\theta_x$ may be in the range of $a*2*\arctan(\frac{1}{2}w_y/f)$ to $b*2*\arctan(\frac{1}{2}w_y/f)$, both inclusively, with preferably a=0.5 and b=6, or more preferably or a=0.7 and b=3, or even more preferably a=0.8 and b=1.5, for example.

Figure 6A:
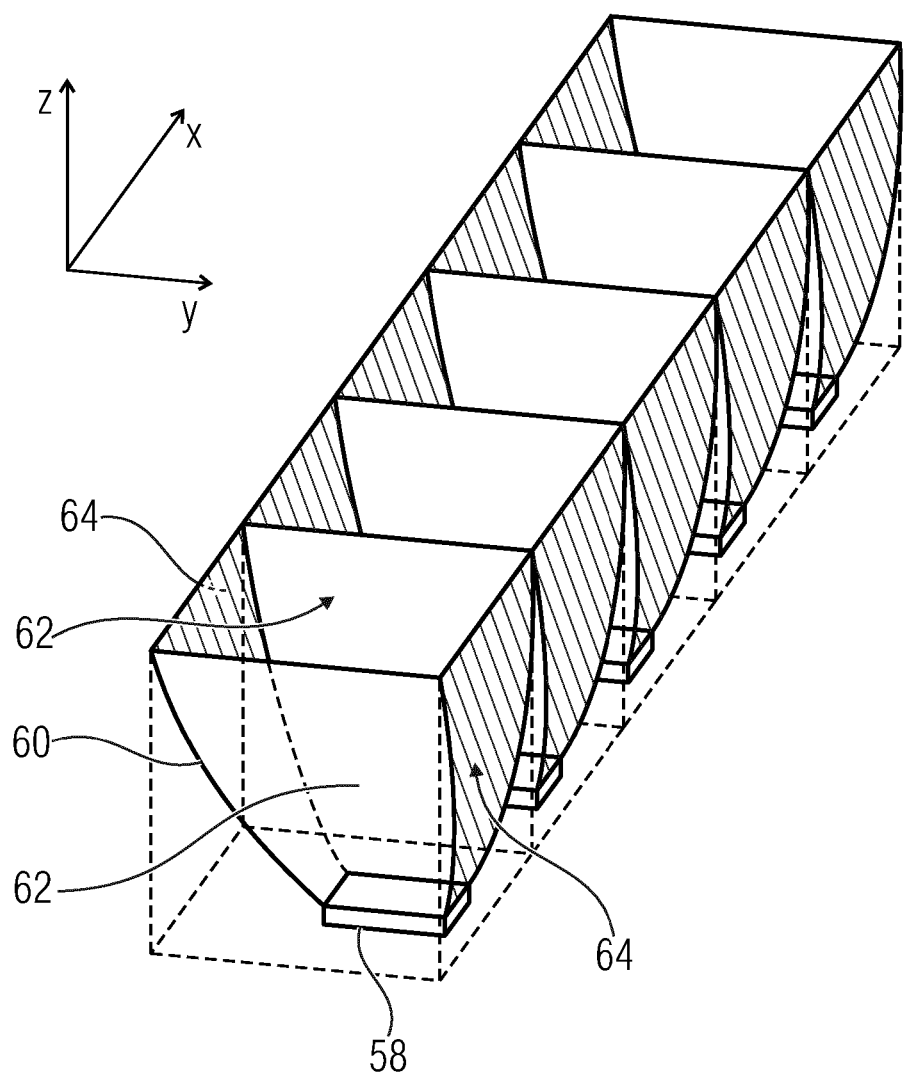
FIGS. 6a and 6b show three-dimensional partial views of the illuminator of FIG. 5 with FIG. 6a showing the light source and a CPC reflector of the illuminator in accordance with one embodiment.
Figure 6B:
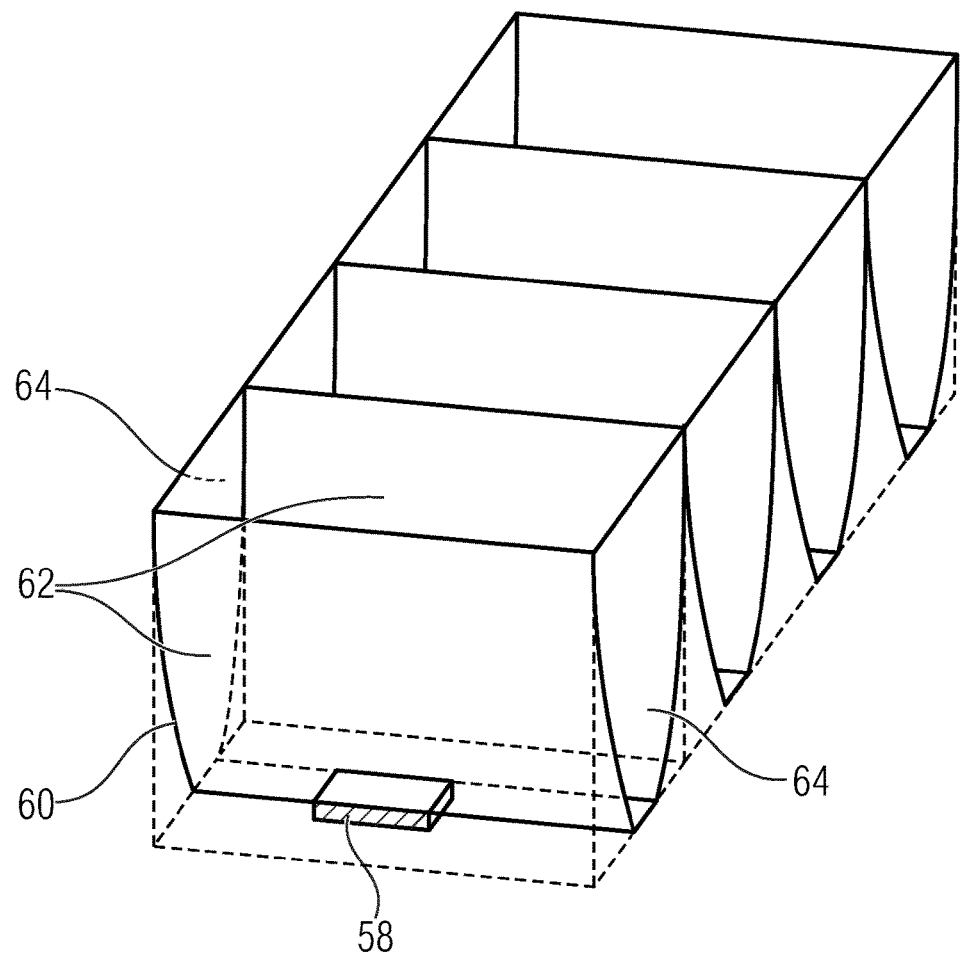

FIGS. 6a and 6b show examples of a construction of the illuminator 26 of FIG. 5. FIG. 6a shows a fraction of illuminator 26 along the elongation direction, i.e. the x-axis. Specifically, the illuminator 26 of FIG. 6a comprises a linear array of couples of anisotripic emitters 58 and CPC reflectors 80 wherein each anisotropic emitter 58 comprises, for example, a LED such as, for example a rectangular white light LED, and each CPC reflector 60 such as, for example, a rectangular CPC (compound parabolic concentrator) reflector, is optically coupled with, and positioned downstream, the LED of the respective couple, i.e. has an input aperture which matches the LED's emitting surface. Each CPC reflector 60 comprises two first parabolic reflecting facets 62, one facing the other, having a curvature that is designed for reducing the LED divergence in the x,z plane, for example for reducing the divergence down to, for example, 10°, or less. Each CPC reflector 60 may further optionally comprise two second parabolic reflecting facets 64, one facing the other, having a curvature that is designed for reducing the LED divergence in the y,z plane, for example for reducing the divergence down to 90°.

Thus, according to FIG. 6a, the illuminator 26 comprises an elongated line-like Sight source 58 composed of a one-dimensional array of individual emitters 58 arranged in line along the x axis and emitting, for example, anistropically light towards to mirror 10. Downstream each emitter 58, a CPC reflector 60 is arranged which reduces the emitter's divergence perpendicular to the x axis. Each CPC reflector 60 comprise an input aperture for receiving light from, and facing, emitter 58, and a output aperture for emitting the light received from its emitter 58 via the input aperture and guided within the respective CPC reflector 60 by way of its reflective inside faces 62 and 64 to illuminate a respective portion of mirror 10. Preferably, the output aperture of all CPC reflectors 60 seamlessly adjoin each other so as to from a continuous face of CPC reflector 60, facing mirror 10.

Each CPC reflector 60 has a cross section which continuously widens from the input aperture towards the output aperture. The widening parallel to the x axis corresponds to a parabolic or similar light concentrating widening. In particular, each CPC reflector 60 may comprise four infernal reflective facets 62 and 64: two facets 64 extending parallel to the x-axis, both facing each other, and two oppositely arranged, mutually facing facets 62 which are, relative to a completely planar extension in a plane perpendicular to the x-axis, bent towards each other in a direction from the output aperture towards the input aperture in the form of a parabola, for example, so that each CPC reflector 60, owing to the concave or parabolic shape of reflective facets 62, reduces, in the xz plane, the diffuseness of the light down to a low divergence, the low divergence fitting to the low divergence achieved in the zy-plane by way of mirror 10 as described above. The concave or parabolic curvature of facets 64, or even their presence, is merely optional, i.e. they could be left off.

FIG. 6b, for example, shows the case wherein said second parabolic facets 64 are replaced by plane reflectors. In this case, the divergence in the plane maintains the natural divergence of the emitters 58.

In a certain embodiment, each emitter 58 comprises an LED which might be equipped with a dome lens such as, for example, a cylindrical lens for reducing the divergence in the x,z plane. In certain embodiments, each emitter 58 comprises a LED and a total-internal-reflector (TIR) lens instead of the CPC, or a combination of TIR lens and CPC.

In a different embodiment, a beam homogenize is positioned downstream the array of emitters 58, for the purpose of improving the uniformity of the linear illuminator 26 in the x direction. For example, the beam homogenize comprises comprise a fly-eye micro lens tandem array, configured to produce the desired light source divergence in the x,z and y,z planes, respectively.

It is worth noticing that some of the described layout for the linear illuminator may generate a rectangular angular divergence which, in turn, may cause the observer to perceive a rectangular (or square) disc 38 when he/she looks at the image of the source reflected by the chromatic mirror 10, instead of a circular one, as desired. With this respect, the layout in FIG. 6b may perform better than the layout in FIG. 6a, due to the fact that it does not produces a sharp cut-off in the source angular profile, at least in the x,z plane.

Figure 8:
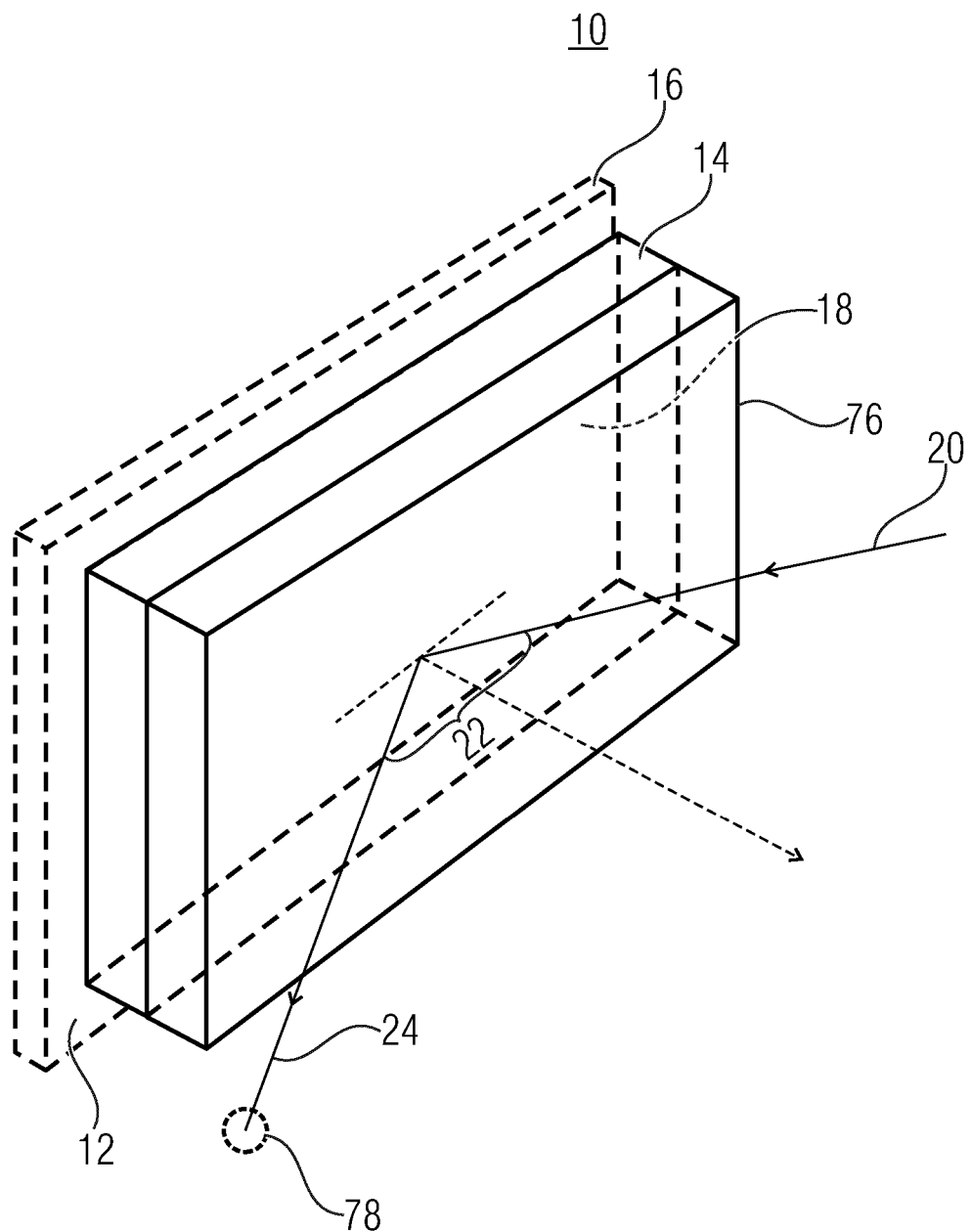
FIG. 8 shows a schematic three-dimensional view of a chromatic mirror additionally having a blurring layer in accordance with an embodiment.
Figure 9:
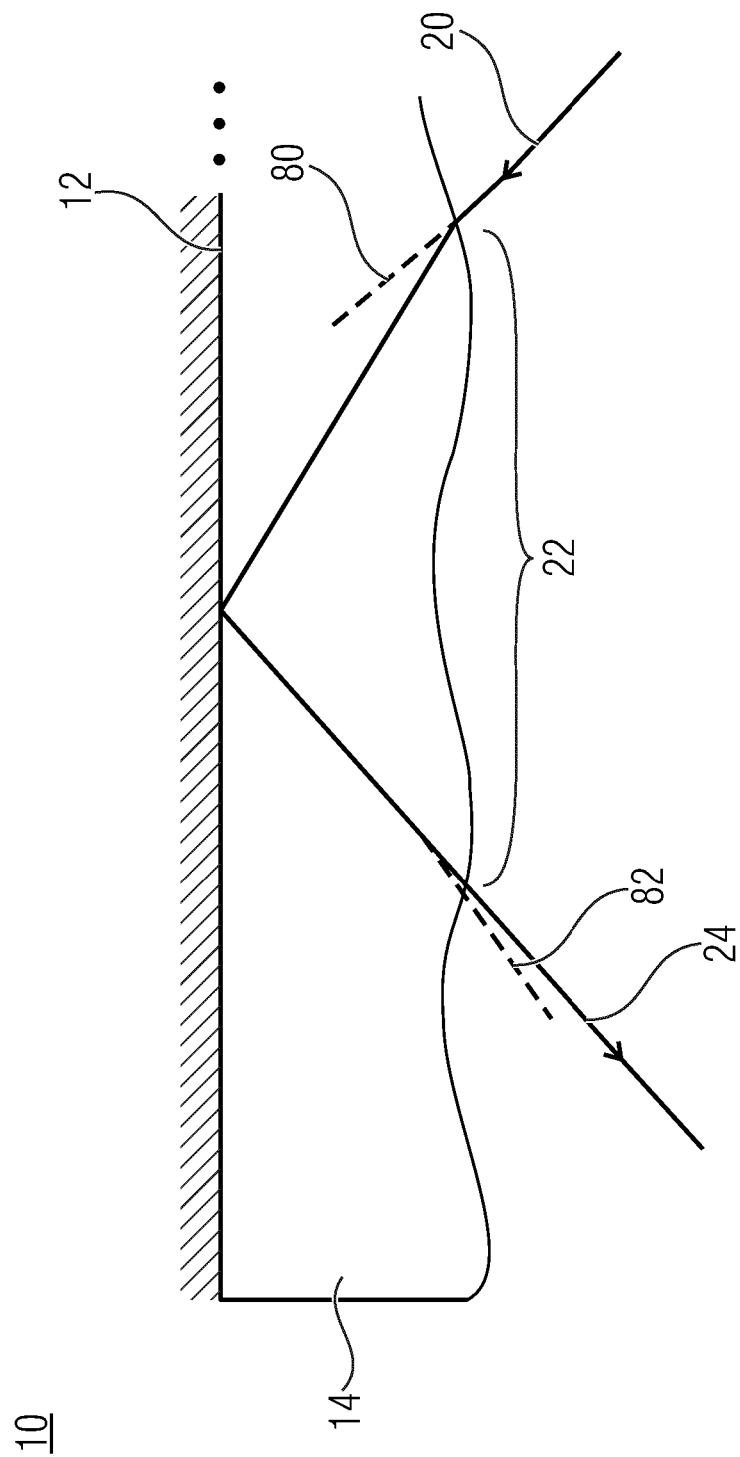
FIG. 9 shows a sectional view of a chromatic mirror in accordance with a further embodiment according to which lateral physical and/or optical thickness variation of the diffusing layer is used in order to achieve a blurring effect.

In a certain embodiment, an improvement for what concerns the generation of round symmetric angular divergence of the light reflected by the chromatic mirror is obtained by implementing onto the chromatic mirror a low-angle white-light diffusing layer, which acts as a low-band pass filter and therefore blooms any image, including the image of the source, by convolving it with a circularly symmetric function with this possibility being further outlined with respect to FIG. 8 and 9.

Thus, in other words, FIGS. 5 to 6b show that the concept of FIG. 4, i.e. the system for illumination, could be modified so as to result in a system where the illuminator 26 and the chromatic mirror 10 are formed in an elongated manner along elongation axis x, wherein the illuminator 10 has a radiation characteristic, i.e. luminance profile, which is divergent perpendicular to the elongation axis x and collimated parallel to the elongation axis x.

Figure 7:
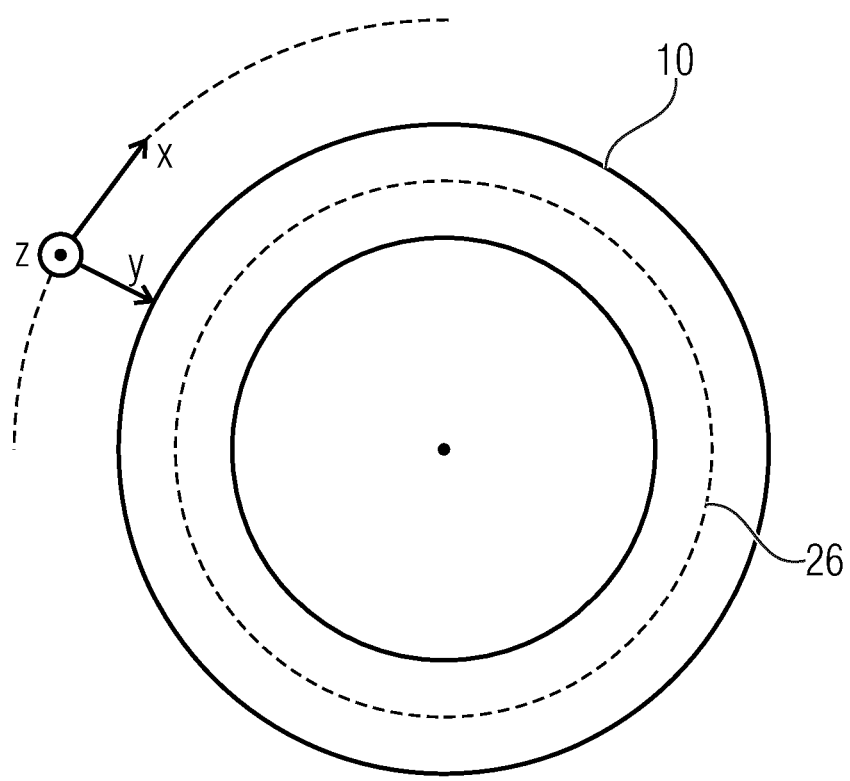
FIG. 7 shows a plan view of the system of FIG. 5 in accordance with a modification according to which the elongation direction of the chromatic mirror and illuminator pair is curved to result in a circular plan view arrangement.

It should be noted that the elongation axis x does not necessarily correspond to a straight line as illustrated in FIG. 5 and FIG. 6a and FIG. 6b. Rather, the elongation axis x may, for example, be bent in the plane perpendicular to the z-axis. For example, the whole setup of FIG. 5 may be bent, when seeing in a top view, so as to result in a circular shape so that the mirroring surface 12 of mirror 10 would assume the form of a donut cut along a horizontal plane with the illuminator 26 then being arranged along the circular focal line defined by mirror 10. The explanations given above would then, however, remain the same by replacing the x axis to define the tangential direction of the circular extension of the donut shape when seen in the plan view, and the y axis corresponding to the radial direction thereof. Such a plan view is illustrated in FIG. 7.

As described above, the concept of forming the mirroring surface 12 of mirror 10 in the form of a concave or even parabolic shape helps in increasing the stability of the achievement of the sun-sky-appearance along with the associated infinity depth impression within the observer's eyes by lowering the divergence of the regularly reflected direct light portion back-emitted by mirror 10. However, as noted above, irrespective of using this concave/parabolic shape concept, there are still aspects which may attract the observer's attention at the time the observer directly looks into the regularly reflected direct light portion, thereby distracting the observer from experiencing the infinity depth impression. For example, all edges of objects, such as object 42 in FIG. 2, the image of which is within the field of view of the observer's eyes via reflection at mirror 10, cause spatial luminance gradients in the sky-like background portion 40 and as the eyes of the observer are especially prone to such irregularities, the following embodiments seek to provide measures to avoid the described distraction.

A first possibility is described with respect to FIG. 8. FIG. 8 shows mirror 10 as comprising, in addition to the elements of FIG. 1, a further layer 76 which is, in comparison to diffusion layer 14, designed to, as far as the visible spectrum range is concerned, show a substantially uniform interaction cross-section with respect to wavelength for the impinging light 20, but an interaction property according to which each interaction event with an inbound impinging light ray merely leads to relatively small propagation direction change of the light ray from before to after the interaction. Accordingly, in the embodiment of FIG. 8, the regularly reflected light 24 substantially has the same spectrum as in the case of FIG. 1, but some of its energy is smeared-out around the specular angle direction as illustratively indicated in FIG. 8 by way of a dotted circle 78.

Although FIG. 8 shows layer 18 as doing arranged at side 18 of diffusing layer 14, according to an alternative, layer 18 may be positioned, for example, between diffusing layer 14 and mirroring surface 12. As will be described further below when discussing possible implementations for implementing and fabricating mirror 10, a possibility to provide diffusing layer 14 with its ability to have a spectrally dependent scattering cross-section and to provide blurring layer 76 with its characteristic to smear-out the regularly reflected light rays is to use a first dispersion of light-scattering centers of an average size smaller than 250 nm for the diffusing layer 14 and a second dispersion of light-scattering centers for layer 76 of an average size which is, for example, exactly or more than 5 times larger, preferably exactly or more than 10 times larger, more preferably exactly or more than 15 times larger or even exactly or more than 50 times larger than the average size of the light scattering centers forming the first dispersion. In a certain embodiment, the size of the light scattering centers forming the second dispersion for layer 76 will be designed so as to be larger than 1 micron, preferably larger than 2 micron, more preferably larger than 3 micron or even larger than 10 micron. Both layers 18 and 76 may use a transparent polymer layer as the matrix for the dispersion. In this regard, both dispersions may be provided within the same matrix layer, e.g. a transparent polymer layer, so that the just outlined blurring characteristic described with respect to layer 76 could, according to an alternative embodiment, be included by layer 14 itself, i.e. layer 14 itself could have this characteristic in addition to its wavelength-dependent scattering cross-section leading to the diffuse scattering.

When using the mirror of FIG. 8 in the embodiments shown in FIGS. 2 to 7, the effect is that, in the observer's eye 30, the resulting perceived scene, i.e. the image, is blurred, i.e. is effectively low-pass filtered so that the previously mentioned steep brightness gradients in the sky-like region 40 of the image, which might distract the observer from experiencing the infinity depth impression, are effectively reduced. For example, the size of the light scattering centers forming the second dispersion 76 and the numbers of said scattering centers per unit of surface of the chromatic mirror 10 may be configured in order to obtain a blurring angle of about 30% preferably 20°, more preferably 10° or even 3° only and a blurring efficacy >50%, preferably >70%, more preferably >90%, in the sense that at least 50%, 70% or 90% of the imping rays experience a deviation within the specified blurring angle.

Another possibility of achieving the just mentioned blurring effect is discussed with respect to FIG. 9. According to FIG. 9, the mirror of FIG. 1 is modified in that the diffusing layer 14 comprises a physical and/or optical thickness which varies laterally. The effect of said thickness variation is that of providing scattering centers which, due to the effect of refraction and/or diffraction, are capable of providing an efficient bending of the impinging light rays. For what concerns the amount of produced angular deviation, i.e. the burring angle, it is well known by elementary scattering theory how this can be computed as a function of the transverse size and of the depth of the thickness modulation (intuitively: smaller size and larger depth produce larger angular deviation). For what concerns the blurring efficacy, the present approach based on the thickness modulation allows to obtain large figures more easily than the previous approach based on usage of a second dispersion of scattering centers, because said thickness modulation can be easily configured in order to minimize and almost avoid the presence of flat profiles, i.e. of non-modulated portions of the diffusing-layer 14 optical thickness. However, in spite of the fact that the thickness-modulation approach is routinely used at the industrial level for blurring filter production, the cost of the technology may be higher than for the previous case based on the second dispersion. Therefore, in a way which is known to the expert of the filed, the profile of the thickness modulation can be configured in order to obtain a blurring angle of about 30°, preferably 20°, more preferably 10° or even 3° only and a blurring efficacy >50%, preferably >70%, more preferably >90%, or even higher than 97%. For example, the thickens modulation may have an average spatial frequency in the range of 10-200, preferably 20-1000, more preferably 40-500 modulations/mm, and a ratio between the depth and the transverse size of the thickness modulation in the range 0.05-2, preferably 0.1-1. However, different examples concerning modulation depth and spatial frequency are also possible, the quoted values being only indicative of the most frequent figures currently used in blurring-filter technology.

Figure 3:
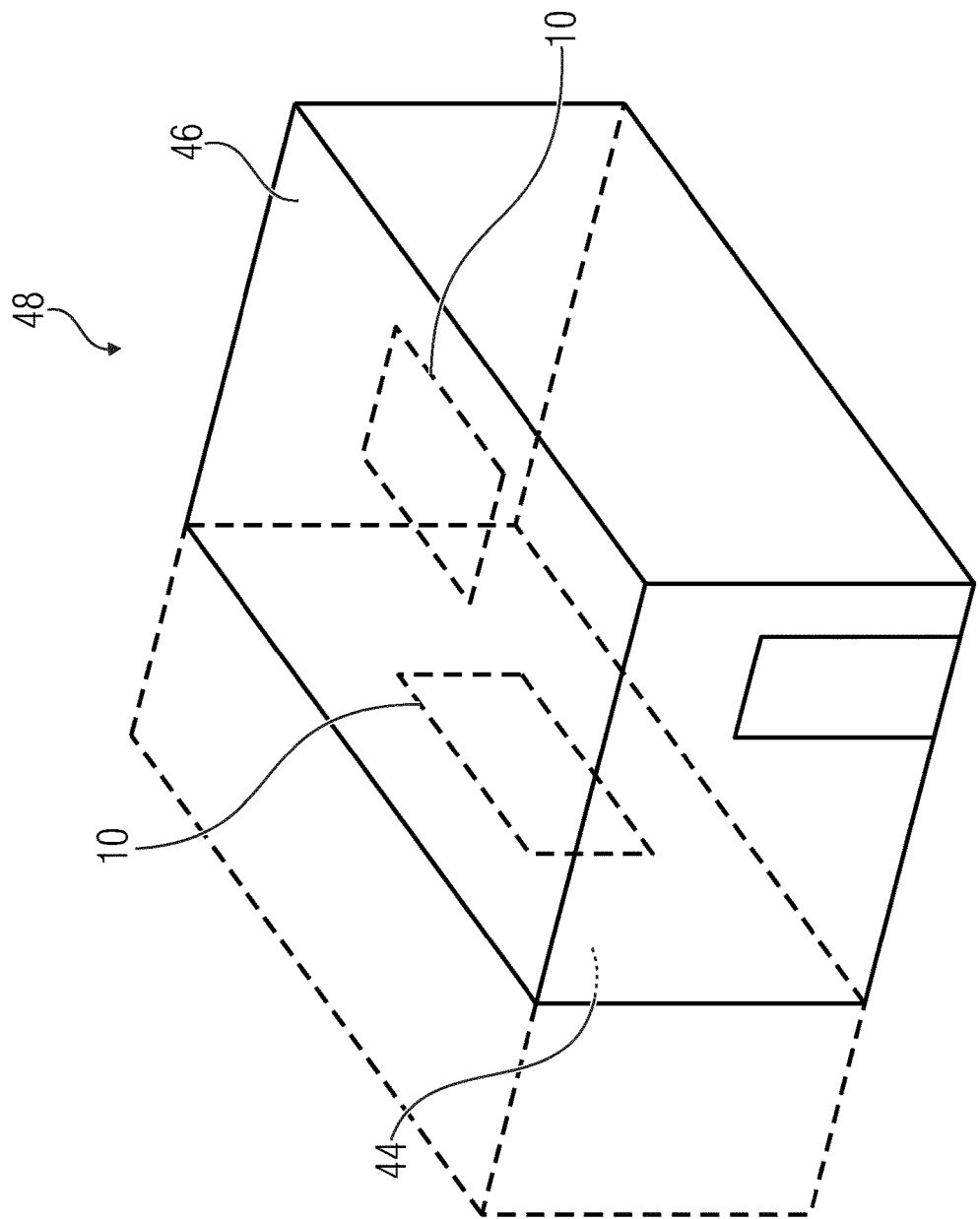
FIG. 3 illustrates possible arrangements of the chromatic mirror when using the concept/system for illumination for the illumination of a room of a building.

The mechanism by which the thickness modulation produces the bending of the impinging light rays as schematically illustrated in FIG. 9, is exemplarily limited to the effect of refraction, which is the dominant one when the transverse width of the thickness variation exceeds the tenths of micron. However, diffraction effects may be exploited, too, as mentioned above. Owing to the optical thickness variation, incident light 20 experiences different minor directional changes 80 and 82 when entering into, and exiting from, diffusion layer 14 with this being true for the regularly reflected light portion 24, i.e. the one not scatter-interacting with the first dispersion in the diffusion layer 14, as well as, less significantly, the diffused, scattered light portion. Compared thereto, in case of a completely even thick layer 14, the directional change at entering and exiting layer 14 would compensate each other so that the regularly reflected light path would be at the specular angle with respect to the light path of the incident light 20. Owing to the varying Inclination of diffusing layer 14 facing away from mirror surface 12, however, the directional changes 80 and 82 do not compensate each other. Rather, depending on the exact location where ray 20 impinges onto diffusing layer 14, the direction at which the regularly reflected, non-scattered light leaves layer 14 deviates more or less, or is merely accidentally equal to, the specular angle direction which would occur if the diffusing layer 14 was flat as shown in FIG. 1. Thus, the varying thickness presented in FIG. 3 is able to generate the blurring effect previously described with respect to FIG. 8 and may, accordingly, be likewise used in order to alleviate the distraction problem with respect to the infinity depth impression.

If should be noted that there are also some further advantages of exploiting the just-outlined blurring effect discussed above with respect to FIGS. 8 and 9. In addition to the aim of
1) hiding object contours of objects such as object 42 using the low angle wide scattering, further advantages are, for example:
2) a more uniform appearance of the inner of spot 38,
3) a smoothening of the outline of spot 38 so that deviations from a circular appearance may be rendered less visible, as discussed above,
4) the appearance of the sun-like disc 38 is enlarged and therefore its glare is reduced,
5) an unevenness of the illumination of the directly lit portion of the illuminated room (compare 52 in FIG. 5, for example) due to, for example, imperfections of the mirroring surface's concave shape, is compensated.

In particular, the lateral variation may be such that light which crosses the layer 14 in the outward direction experiences a low-angle diffusion so that red light rays at 650 nm which cross layer 14 in the inward direction and are reflected by the mirroring surface 12 and cross again layer 14 in the outward direction have—assuming a spatial even probability of incidence, i.e. an isotropic illumination—at least 50%, preferably 70%, more preferably 90% or even 97% probability of experiencing an angular deviation in the range of 0.1° to 15°, preferentially 0.1° to 10°, more preferentially 0.1° to 5° or even 0.1° to 1.5° from the direction of specular reflection.

Further, speaking differently, the physical and/or optical thickness variation of the layer of varying thickness may be configured such that the chromatic mirror 10 has finally a regular reflectance, i.e. the reflectance at the specular angle, smaller than 50%, preferentially smaller than 30%, even more preferentially smaller than 10% or even smaller than 3% with respect to the case of a flat diffusing layer 14 which comprises only the first nanoparticle dispersion.

Even further, it should be noted that alternatively to the description of FIG. 9, instead of using diffusing layer 14, another layer could be provided in addition to layer 14 which is transparent and has the described variance in physical and/or optical thickness variation. Accordingly, such a transparent layer of varying thickness could be positioned at the side 18 of diffusing layer 14 just as layer 76 in FIG. 8 was added to diffusion layer 14.

Figure 10:
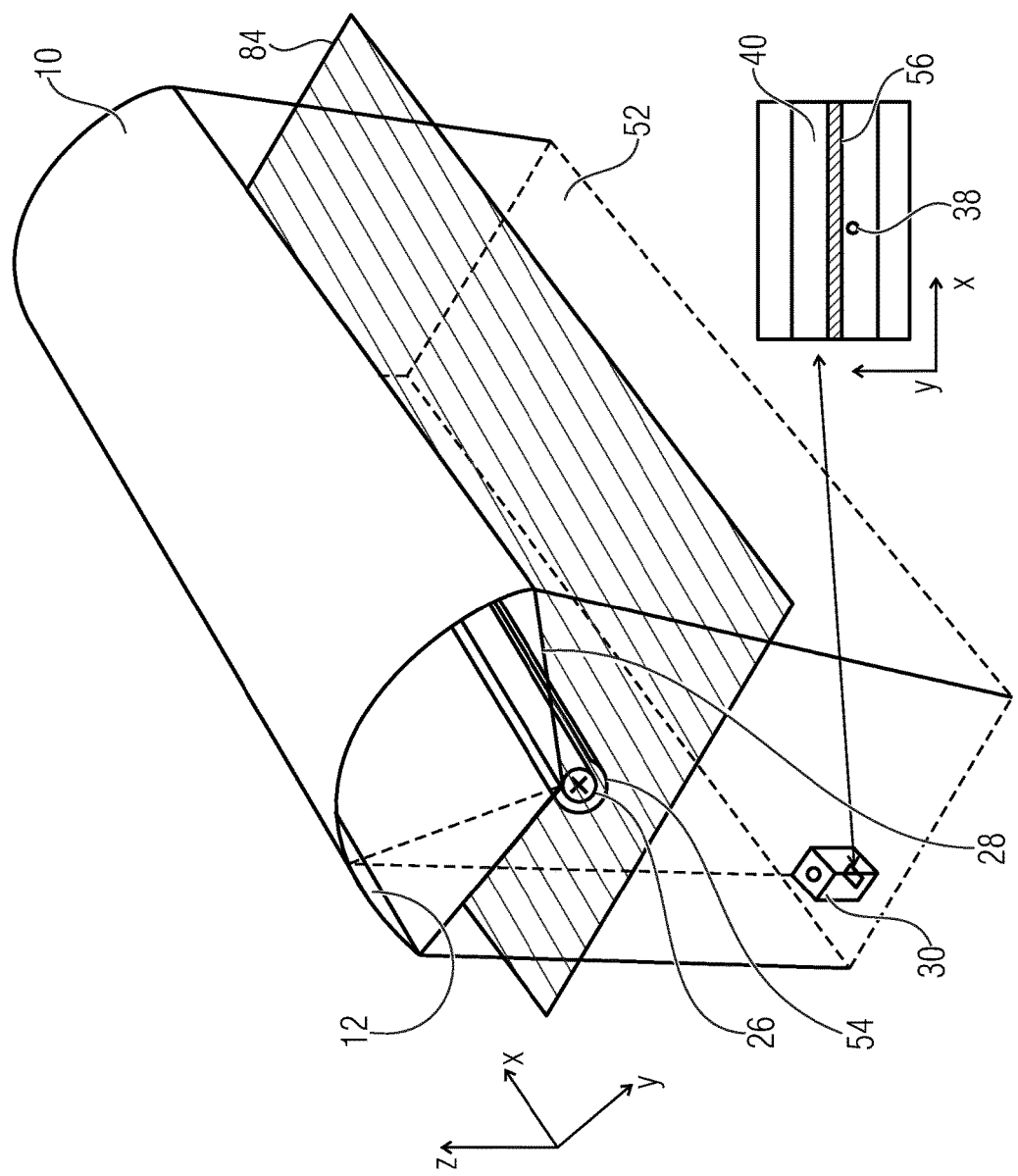
FIG. 10 shows a schematic three-dimensional view of an illumination system, using a transparent layer 84 downstream the chromatic mirror in accordance with an embodiment.

Another possibility to achieve a reduction in distraction probability is presented below with respect to FIG. 10. FIG. 10 merely exemplarily forms a modification of FIG. 5, but the usage of a semitransparent layer outlined with respect to FIG. 10 could alternatively also be used in combination with any of the other systems of combinations of an illuminator and a mirror 10. In the context of present application, "semitransparent layer" shall denote something which
  (i) transmits without disturbance a portion of the impinging light, for example, has a regular transmittance preferably in the range 5-50%, more preferably 10-40%, even more preferably 15-30%,
  (ii) scatters the rest of the light over arbitrary directions, preferentially in an isotropic way or at least ensuring that more than 30%, preferentially 50%, more preferentially 70% of the scattered light is deviated by more than 5°, preferably more than 10°, more preferably more than 15° from the direction of the impinging light.

Additionally, in a certain embodiments it is beneficial that the scattering occurs preferentially in the forward direction, e.g. it is preferred that the semi-transparent layer show a ratio between forward and backward scattering efficiency >1.1, preferably >1.5, more preferably >2 or even >5.

FIG. 10 shows a semi-transparent layer 84 as being positioned downstream mirror 10, i.e. between the area 52 sit by the regularly reflected light where the observer's eyes are expected to be. In other words, the semi-transparent layer 84 is arranged, and is held, in a position between observer on the one hand and mirror 10 on the other hand. The semi-transparent layer may be a fabric tent. In the case where mirror 10 along with illuminator 26 is arranged at the ceiling of a room, the semi-transparent layer 84 may be suspended beneath illuminator 26. Independently from the position of mirror 10 and illuminator 26 inside the room, the effect of the semitransparent layer 84 may be the typical effect of a tent in front of a window, as for example the effect of producing a screen which (i) is illuminated by the direct warm light of the sun, which casts onto the tent a luminous and sharply defined spot of warm light which, in turn, illuminates the room by diffused light,
  (ii) is illuminated by the bluish and diffused light from the sky, which produces a bluish tinge onto the tent and particularly in the surrounding of the projected warm sun spot, thus leading to an easy perception of the beautiful combined action of the light from the sun and the sky.

In a certain embodiment, semi-transparency of semitransparent layer 84 shall describe the semitransparent layer 84 characteristic, so as to, in a fine granular manner, be partitioned into portions being completely transparent for light crossing layer 84, and other portions which are not, i.e. deviate the light seeking to cross layer 84. For example, there may be openings in layer 84, with the material of layer 84 otherwise acting as a a white-light diffuser, as for the case of a white fabric. In a certain embodiment, the semitransparent diffuser may also be colored, or partially colored, as it is often the case for domestic fabric tents. In different embodiments, the semitransparerent diffuser may have a regular transmittance which varies from one point to another, as it is suited for the purpose of exhibiting aesthetical figurative effects. In all the embodiments, the fact that the semitransparerent diffuser has a non-zero regular transmittance ensure that the observer has always the possibility of perceiving the flashed portion of the light source beyond semitransparerent diffuser and, according to the configured distance between the observer and the real/virtual image of the light generator she/he might gain the perception of the existence of an infinitely deep space beyond the semitransparerent diffuser, for the same reason and by means of the same mechanisms outlined above for the case in the absence of the semitransparerent diffuser.

In a certain embodiment the semitransparent layer 84 may produce the following effect: an observer looking onto mirror 10 within the direct light portion 52 is prevented from seeing all of the details of the reflected light generator or, more relevantly, of the reflected room, which might spoil the experience of infinite depth perception. In fact, her/his visual attention may be now more attracted by the luminous spot onto the semitransparent layer, e.g. the tent, and by the mentioned contrast between warm and bluish light onto the same diffuser, i.e. the attention is attracted by effects naturally occurring at finite distance from the observer, instead of being attracted by the room reflection into the mirror, which leads to a non-natural effect. As a result, the observer is less likely distracted from experiencing the infinity depth impression.

Before describing some embodiments for realizing and fabricating a chromatic mirror 10 according to any of the above embodiments, it should be noted that the systems for illumination described above with respect to FIGS. 2 to 7 and 10 might be used in the form of an array of such systems, such that the light which is regularly reflected by the chromatic mirrors of these systems forms an array of light beams oriented in the same direction. For example, the illumination system of FIG. 5 could be positioned side by side so as to cover, for example, the whole ceiling of a room instead of merely a portion thereof.

Beyond that, it should be noted that all of the illumination systems described above form, along with optional surrounding building elements such as walls, ceilings and the like, an architectural object, i.e. a building, such as a house or the like, which participates in the advantages of the embodiments outlined above.

Figure 11:
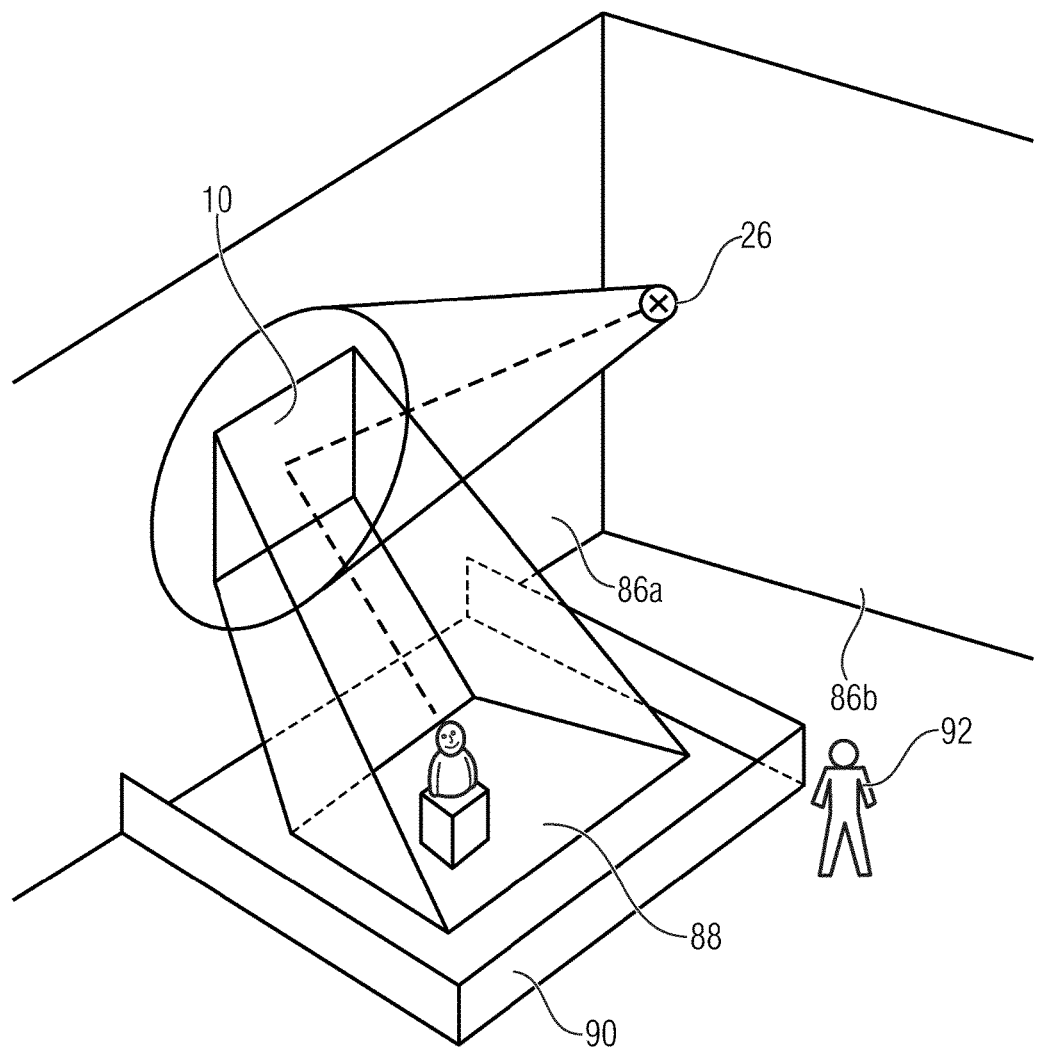
FIG. 11 shows a three-dimensional view of a portion out of an architectural object or building where a blocked area prevents visitors from directly looking into the regularly reflected light portion used to illuminate a certain interesting area within the blocked area in accordance with an embodiment.

Further, in this respect, it should be noted that the advantages provided by the embodiments using the concave or even parabolic shape of the mirroring surface do not have to be necessarily used. In some applications, e.g. even in conditions where the light, generator is positioned so close to the chromatic mirror that the observer will unavoidably perceive it a finite distance, as well as in condition where to the usage of a plurality of Illumination devices may cause the observer to perceive simultaneously, i.e. from a single observation position, the presence of more than one light generator, i.e of more than one sun. Even in these cases architectural measures may have been taken in order to prevent people from directly looking into the direct light beam formed by the regularly reflected light from mirror 10. FIG. 11 shows such an example for an architectural object. FIG. 11 shows two walls 86a and 88b of the room of the architectural object, wherein the mirror 10 is hung up on wail 86a for illustration purposes. Mirror 10 is illuminated by illuminator 26 which, in turn, is, for example, suspended at the ceiling of the room. The direct light, regularly reflected by mirror 10, is shown as exemplarily lighting a certain area of the room where, for illustration purposes, a sculpture is shown to be positioned. In order to prevent people from accidentally directly looking onto illuminator 26 via mirror 10, the area 88 directly lit by the direct light is shown to be included within a blocked area, blocked against human visitors seeking to enter the blocked area. In FIG. 11, the blocked area is exemplarily defined by a fence 90 surrounding the area 88 lit by the direct light. Accordingly, any visitor or observer 92 outside the blocked area defined by fence 90 is prevented from directly looking into the illuminator 26 via mirror 10, but merely sees the sky-like diffuse light and the direct sun-like rays illuminating a scene, and may accordingly feel as if mirror 10 would be a window permitting a view into the sky, all these effect being perceived without directly seeing the sun. Notably, this setting may be used in order to release the constraint about the perceivable shape of the light generator or of its flashed area, which can be of any shape in this case.

After having described certain embodiments for a chromatic mirror and concepts and systems using the same in an advantageous manner, some specific implementation examples and examples of fabricating such a chromatic mirror are described in the following.

Figure 12:
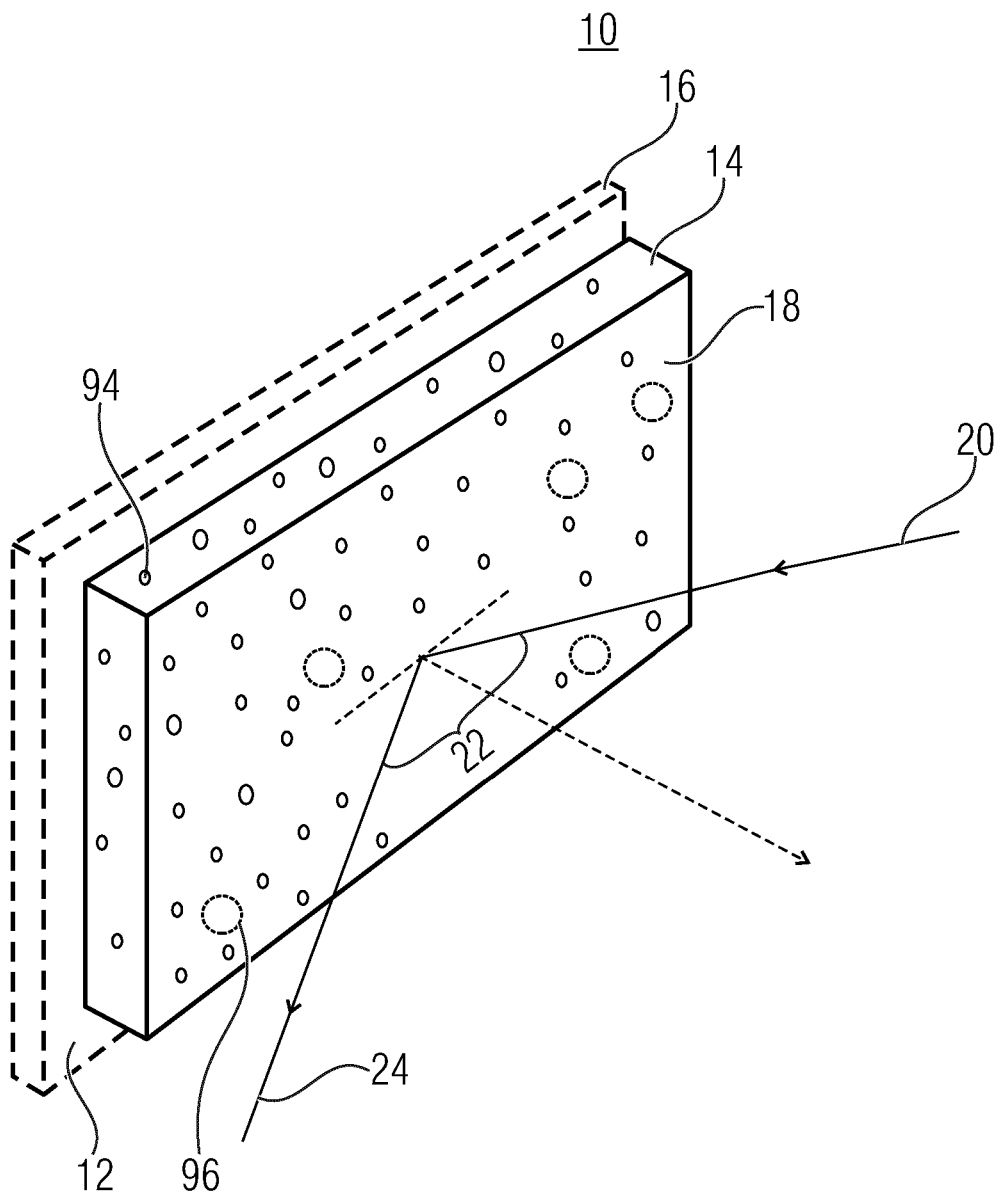
FIG. 12 shows a schematic three-dimensional view of a chromatic mirror in accordance with an embodiment, where a dispersion of light-scattering centers is used to provide the diffusion layer with its diffusion property.

As has already been described above, the diffusing layer 14 may be a coating or a film, e.g. a layer having a preferably a thickness <0.2 mm, more preferably <0.1 mm, even more preferably <0.05 mm or, for a certain embodiments, even <0.01 mm, deposited onto the mirroring surface 12. FIG. 12 illustrates that the diffusing layer 14 may be provided with its wavelength dependent scattering cross-section by forming the diffusing layer 14 as a transparent polymer layer having a dispersion of light-scattering centers, i.e. nanoparticles, of an average size smaller than 250 nm embedded therein. The light-scattering centers or nanoparticles are indicated using reference sign 94. FIG. 12 also illustrates that the transparent layer of the diffusing layer 14 may, optionally, also have a second dispersion of other light-scattering centers 96 embedded therein, with an average size of the light-scattering centers 96 being, for example, greater than 5 microns. See also the above notes concerning a relationship between the average size of the light-scattering centers of the first and second dispersions, and further examples for absolute minimum average sizes. While the dispersion of light-scattering centers 94 provokes the above outlined wavelength-dependent diffuse scattering, the second dispersion of light-scattering centers 96 provokes the blurring effect outlined with respect to FIG. 8 and layer 76, respectively, insofar, FIG. 12 is an example for the above mentioned alternative to FIG. 8, according to which both characteristics, i.e. wavelength-dependent diffuse scattering and low-angle white light blurring, are unified within the same layer 14.

In construing mirror 10, transparent polymer layer 14 with dispersion 94 and optionally dispersion 96 may be fabricated first so as to result in a film which is then applied onto mirroring surface 12, or onto which the mirroring surface 12 is then formed, or alternatively, the dispersion 94 and optionally dispersion 96 along with the transparent polymer material of layer 14 are directly deposited onto mirroring surface 12 such as, for example, by way of spraying, inkjet method, film spinning, deep coating, coil coating, metal vacuum deposition, molecular beam epitaxy, plasma coating, or the like.

The density of first and second diffusions may be selected such that the diffuse reflectance of the chromatic mirror is, for example, greater than 50%, greater than 80% or even greater than 90%. That is, virtually all the infringing light may be scattered, either at low angles at the second dispersion or at large angles at the first dispersion, leaving a negligible regularly reflected light portion.

Figure 13:
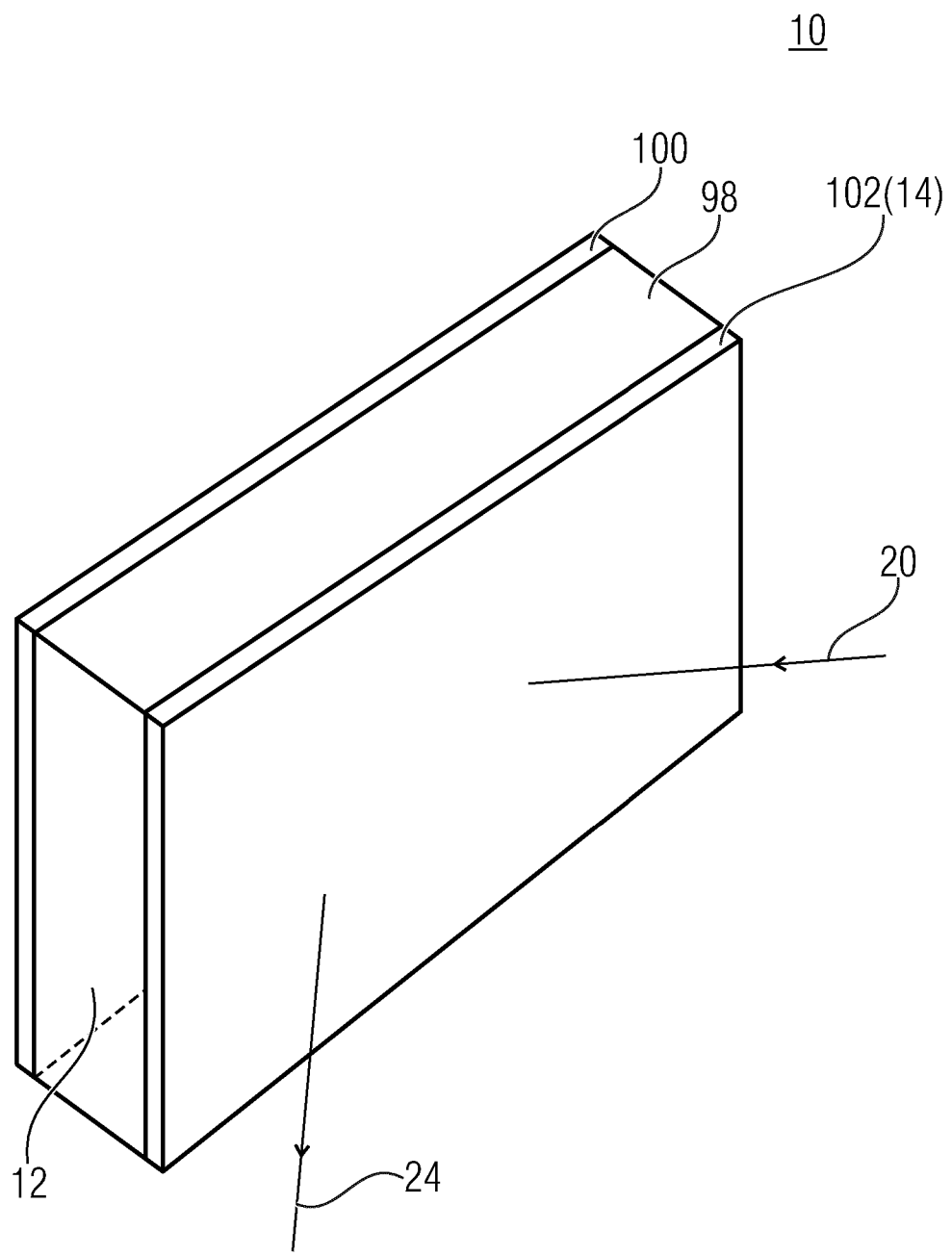
FIG. 13 shows a three-dimensional view of a chromatic mirror in accordance with an embodiment using a transparent panel or flexible polymeric film as a support member for supporting coatings or films fulfilling the task of the diffusing layer and mirroring surface, respectively, in accordance with an embodiment.

FIG. 13 shows a further embodiment of realizing a mirror 10. According to FIG. 13, a transparent panel 98 is positioned between a coating or film 100 forming mirror surface 12, and another coating or film 102 forming the diffusing layer 14. Coatings or films 100 and 102 may comprise the dispersions outlined with respect to FIG. 12. In other words, the transparent panel which may be a polymeric, e.g. an acrylic, polycarbonate, a mylar, a PVC or the like, panel or a glass or a stratified-glass panel, has two main sides or facets, with coating or film 100 being positioned on one facet, and the coating or film 102 being deposited onto the other facet.

Accordingly, in case of FIG. 13, mirror 10 may be stiff or flexible or even tensile, with a stiffness/flexibility/tensibility provided by the transparent panel 98. Note that the term panel in the context of the present invention is just used to mean a layer of any possible thickness, therefore it may be also a film or a coating and may be not necessary rigid.

Figure 14:
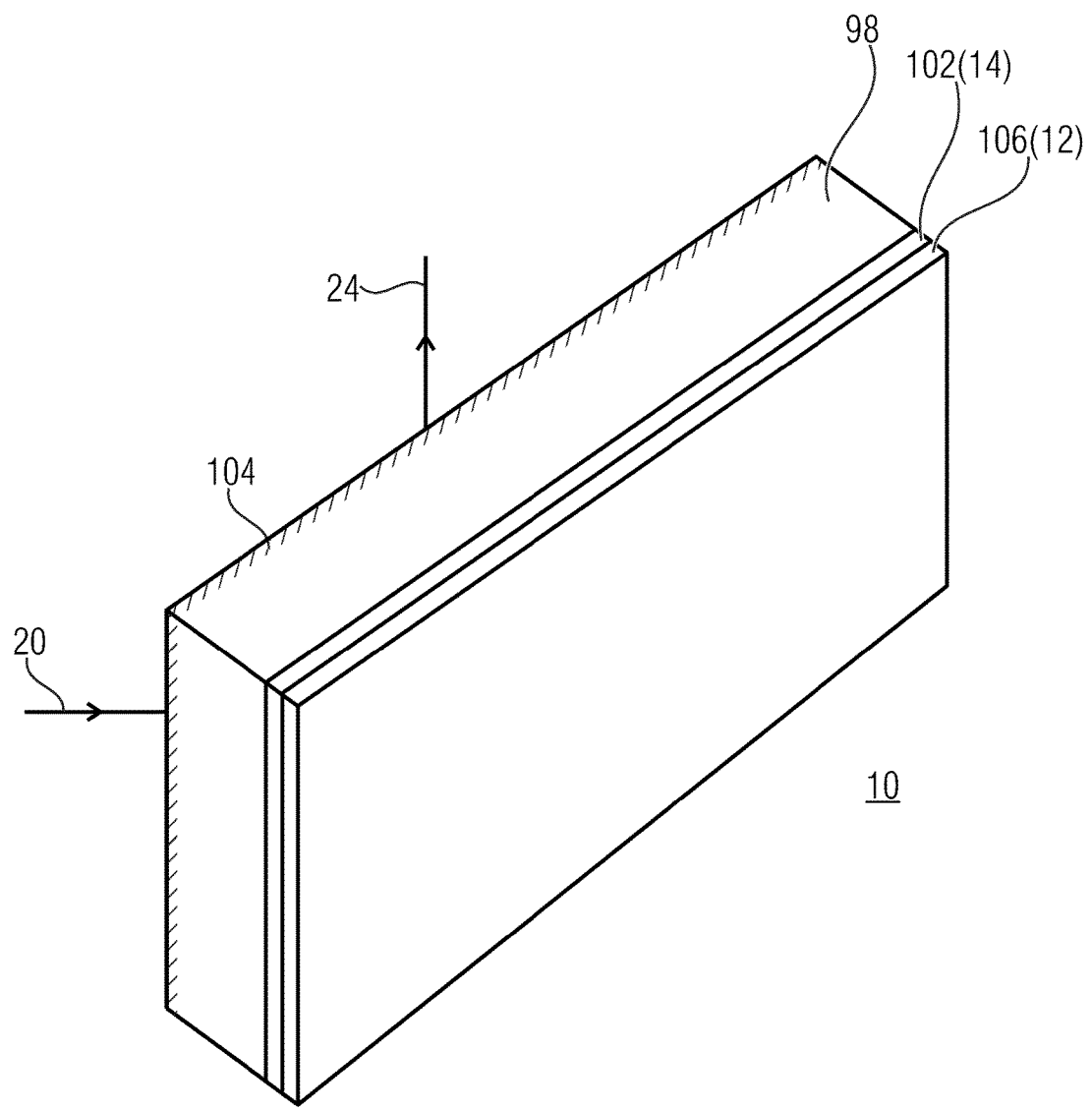
FIG. 14 shows a three-dimensional view of a chromatic mirror differing from FIG. 13 in that coatings or films forming the mirroring surface and diffusing layer, respectively, are arranged at the same facet of the transparent panel or flexible polymeric film.

FIG. 14 shows a variation of the embodiment of FIG. 13 according to which both coatings or films 100 and 102 are positioned on the same side or facet of transparent panel 98. For example, coating or film 102 is positioned between coating or film 100 and transparent panel 98 with the coating or film 100 or the side thereof facing diffusing layer 14 forming the mirroring surface 12.

Interestingly, the embodiment of FIG. 14 enables the avoidance of using the tin side of a glass panel in the case of using such a float glass panel as transparent panel 98. In other words, in case of FIG. 14, the transparent panel 98 may be embodied as a float glass panel and in that case, the tin side may be used as the side facing away from coatings or films 100 and 102, whereas the air side of the float glass panel 98 contacts coating or film 102. By this measure, the effects resulting from the tin used for the production of the float glass panel are prevented from negatively affecting films or coatings 102 and 100.

For illustration purposes, the tin side is illustrated in FIG. 14 using hatching and indicated using reference sign 104.

Figure 15:
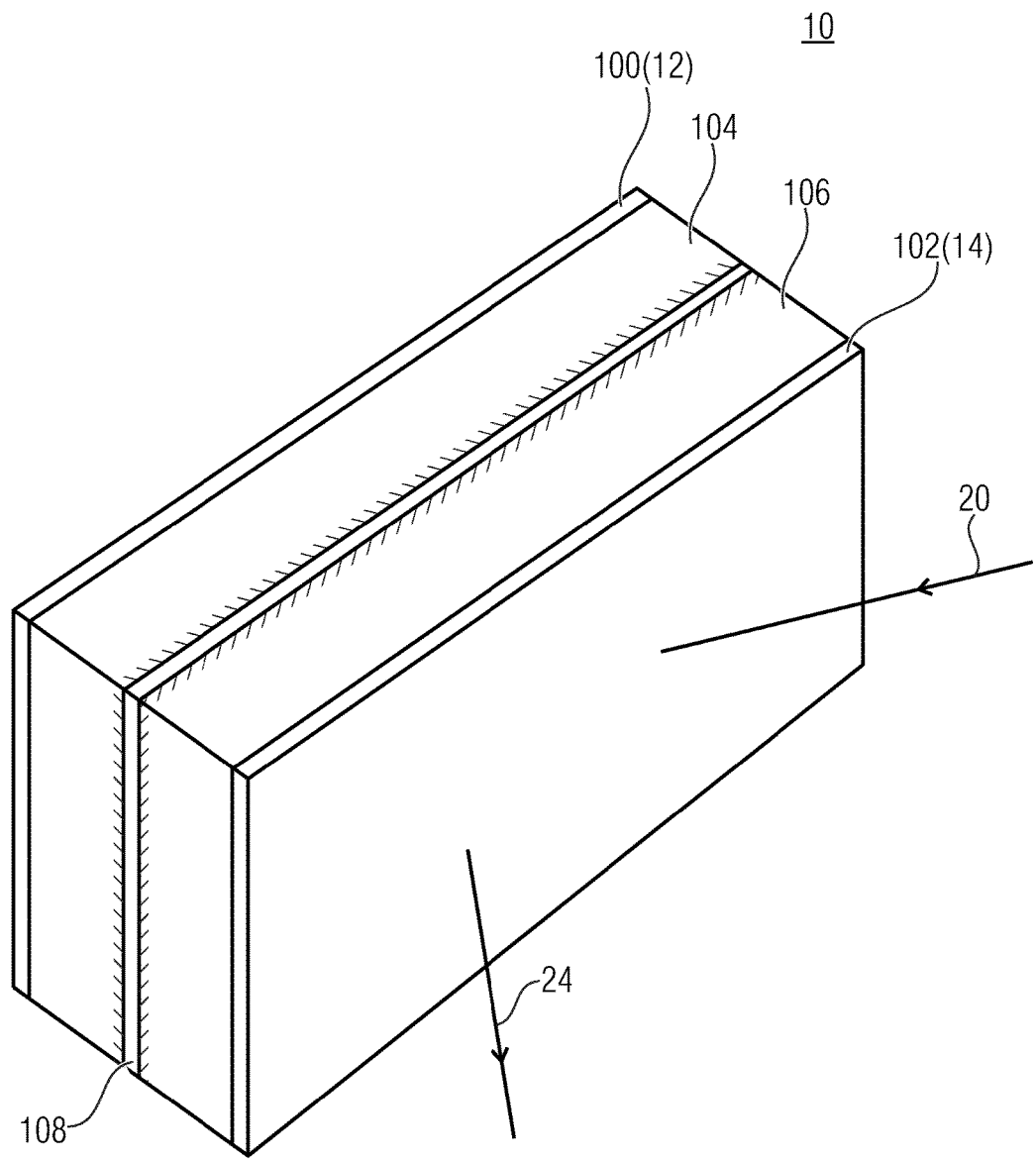
FIG. 15 shows a three-dimensional view of a further embodiment of a chromatic mirror using a stratified-glass panel composed of two float glass sheets.

FIG. 15 explains how the embodiment of FIG. 13 may be construed by way of float glass sheets, avoiding depositing any of films or coatings 100 and 102 onto any tin side of the float glass sheets. In particular, in accordance with FIG. 15, the chromatic mirror 10 comprises a stratified-glass panel composed of two float glass sheets 104 and 106 sandwiching, and affixed to each other, by way of an adhesive transparent polymeric film 108, e.g. an EVA or PVB film, wherein the facet of the two glass sheets 104 and 106 facing, and attached to each other via the adhesive polymeric film 108 are the glass tin sides of float glass sheets 104 and 106, and the coating or film 100 forming the mirroring surface 12 is deposited onto the air side of float glass sheet 104, whereas the coating or film 102 forming the diffusing layer 14 is deposited onto the air side of float glass sheet 106. By this measure, the mirror 10 of FIG. 15 behaves also as a "safety glass panel", and fulfills many requirements imposed onto the usage of elements in buildings such as shock resistance (e.g. the fact that the panel does not separate in many parts when it eventually got broken), fire resistance and the like.

Figure 16:
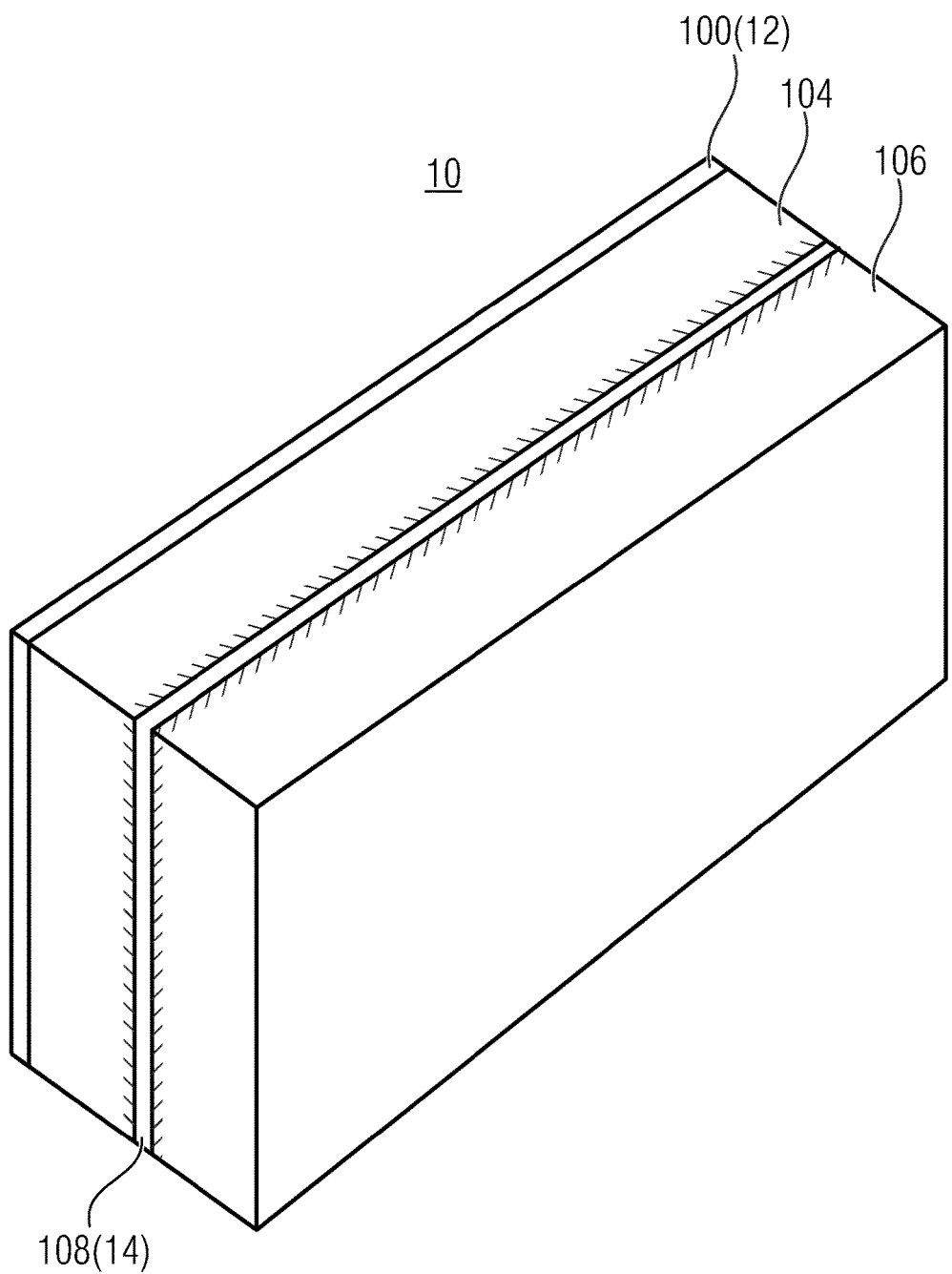
FIG. 16 shows a three-dimensional view of a chromatic mirror in accordance with an embodiment differing from FIG. 15 in that the adhesive transparent polymeric film in between the float glass sheets concurrently assumes the task of the diffusing layer.
Figure 18:
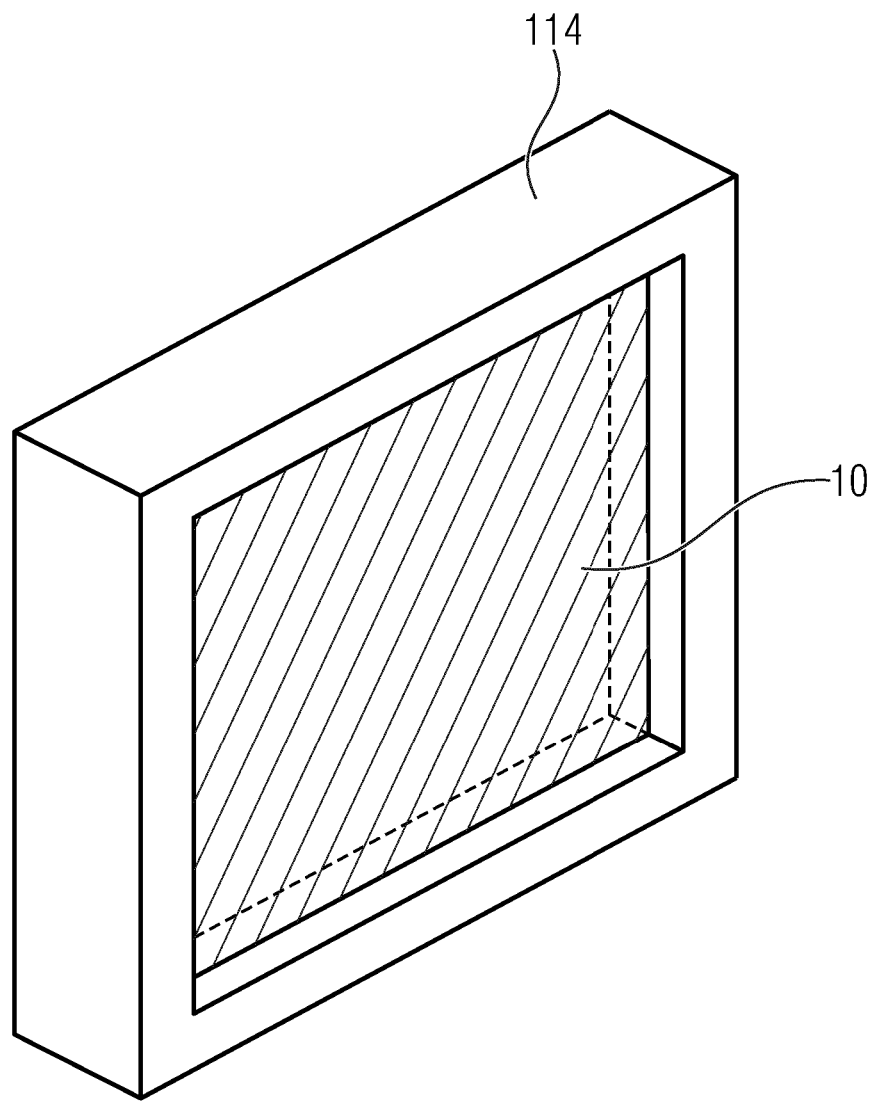
FIG. 18 shows a three-dimensional view of a chromatic mirror using a frame for holding the chromatic mirror of FIG. 17 in place.

Another embodiment is shown in FIG. 16. Here, the embodiment of FIG. 15 is modified in that the diffusing property of the diffusing layer is transferred from the separate film or coating 102 of FIG. 15 towards the transparent layer 108 between float glass sheets 104 and 106 which, accordingly, serves as both adhesive transparent polymeric film as well as the diffusion layer. For example, the adhesive transparent polymeric film may concurrently serve as a matrix for the dispersion of light-scattering centers 96 depicted in FIG. 12. Thus, the mirror of FIG. 18 may be fabricated very easily by way of processes which occur anyway in case of fabricating a two-sheet stratified glass panel with merely the film or costing 100 needing depositing onto the air side of one of the float glass sheets 104 or 106 (104 in the case of FIG. 16).

In case of the embodiments of FIGS. 13 to 16, the transparent panel and glass sheets, respectively, assumed the role of the supporting member, or supporting layer. In the case of the glass sheet and glass panel examples, same provide the mirror 10 thus construed with stiffness.

Figure 17:
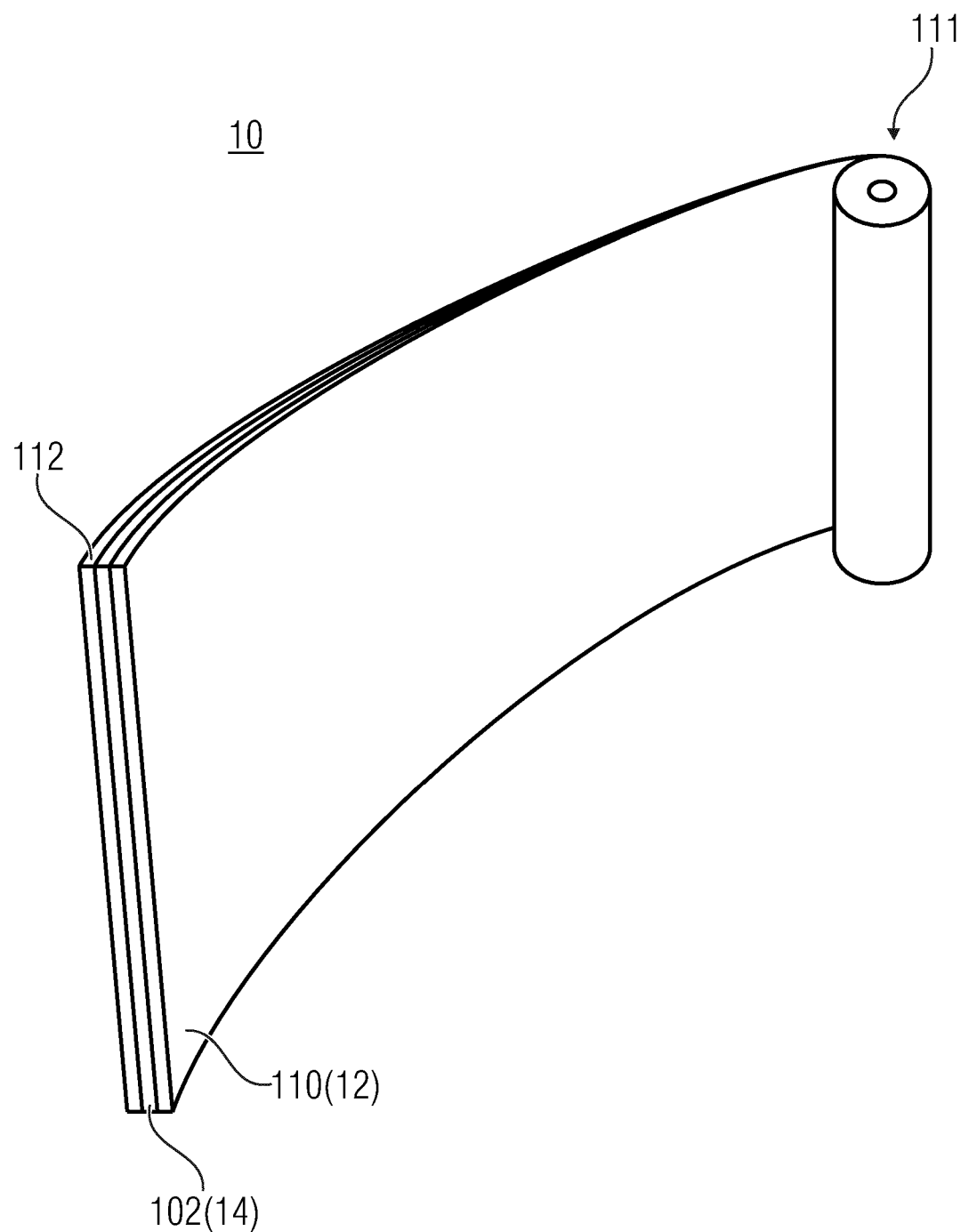
FIG. 17 shows a three-dimensional view of a chromatic mirror using an aluminum metal foil in accordance with a further embodiment.

Embodiments of FIG. 17 show an example where the mirroring surface is formed by an aluminum metal mirror foil having e.g. very high-reflectivity (e.g. with reflectivity >95%, and even >98%) as the ones nowadays used, e.g. for fluorescent-tube light reflectors, or for solar light reflection in the outdoor, and produced by means a several industrial process such as, for example, electrophoreses, metal vacuum deposition, organic and/or inorganic material coating, including the usage of micro and nanoparticles, as suited, for example to control the index mismatch and so increase reflectivity or to enhance the mechanical and chemical resistance of the mirror to external agents, such as to atmospheric agents for the case of outdoor applications. In a certain embodiment, the diffusing layer 14 may be formed by a coating or film 102 deposited directly onto the finished aluminum mirror foil, indicated using reference sign 110 in FIG. 17. Alternatively, the diffusing layer 14 may be deposited in the course of the industrial process suited for the Al mirrofoil production. This second solution implies a more complex and costly process, but it may lead to a better finishing of the chromatic mirror 10, especially for outdoor applications.

In both cases, accordingly, the aluminum metal mirror foil 110 may provide the resulting mirror 10 with suitable flexibility as necessary for being processes by means of coil-coating technique and for being stored in coils. For illustration purposes, FIG. 17 shows the mirror 10 as being furled into a coil 112 such as, for instance, for the sake of delivery or transport.

In any of the above outlined embodiments, the diffusing layer or the film or coating 102 forming the same may be a transparent polymer layer with a dispersion of the aforementioned light-scattering centers 96. The latter light-scattering centers may, for example, be organic nanoparticles or, in the aim of obtaining the largest scattering efficiency an so the smallest possible thickness for the scattering layer 14, also inorganic nanoparticles, such as $TiO_2$, ZnO nanoparticles, which feature a larger index mismatch with respect to the organic matrix, and have an average diameter of smaller than 250 nm. These inorganic nanoparticles may be protected against photo-catalysis introduced by near-UV and/or visible light radiation, as it is currently done by industrial nanoparticle suppliers.

In a different embodiment, the diffusing layer 14 my comprise nanoparticles, e.g. inorganic nanoparticles, dispersed into an inorganic matrix, such into a glass of silica-based material, such as a sol-gel based material. This option may imply the use of large industrial plants, as it is typical the case for the glass production industry, but will have the benefit of reducing the number of steps and thus simplifying the industrial process and reducing the cost, making the new process to differ very slightly from the standard industrial process for the glass, tempered glass, stratified glass and glass mirror production.

Further, FIG. 17 shows rather representatively for all of the above-outlined embodiments for mirror 10 that a protective layer 112 made of a transparent material and resistant to atmospheric agents may protect the diffusing layer 14. In the case of FIG. 17, for example, the diffusing layer 14, i.e. film or coating 102, is sandwiched between the aluminum metal mirror foil 110 and the protective layer 112. The protective layer 112 may, for example, be an inorganic film or a sol-gel film such as a silica sol-gel film or a film comprising silica micro or nanoparticles.

As has already been mentioned above with respect to FIG. 17, the mirror 10 according to FIG. 17 is flexible. In accordance with an embodiment shown in FIG. 18, the mirror 10 is thus held in a fixed position by way of a frame 114 which surrounds the outer circumference of mirror 10 which processes a foil-like flexibility in accordance with the embodiment of FIG. 17.

By way of the frame 114, the mirror 10 may be held, for example, at a fixed position with respect to a wall or the like. In a certain embodiment, the chromatic mirror 10 based on a Al mirror foil support may feature a plurality of perforations, e.g. perforations having a size in the range of 1-100 mm, preferably in the range 5-50 mm, as if is convenient for applications of the chromatic mirror 10 for the construction of building coats acting as chromatic ventilated facades. Hover, some application of the chromatic mirror 10 for ventilated façades, or ever for aesthetical building façades, does not necessary require the perforation to be made.

With respect to FIGS. 13 and 14, it is noted that the transparent panel 98 shown therein may be replaced by flexible members such as a transparent flexible polymeric film so that the resulting mirror 10 is provided with tensibility, i.e. it can be kept in tension by a suitable frame, e.g. a tensile structure as the one used for shade-making tents in the outdoor. Accordingly, when using a flexible polymeric film 98 in FIGS. 14 and 13, the resulting chromatic mirror 10 forms a tensile structure which is bendable into various shapes such as, for example, a concave or even parabolic shape as discussed above. This feature can be used, for example, for construing large sky-like ceiling in sport holes, SPAs, entertainment parks, etc., wherein not only the vision of the sky is ensured but also that of the sun.

Instead of using a metal foil in order to form the mirroring surface, alternatively a fabric coated with a reflective coating could be used. This option can be used, e.g., in the fashion industry in order to crate sky-sun clothes featuring an appearance that changes with the type of illumination, and specifically with the type of directionality of the illumination, which in turn means with the change of atmospheric condition from the case of a clean day, ensuring strongly directional light, and the overcast day, wherein ail the light is diffused.

Figure 19:
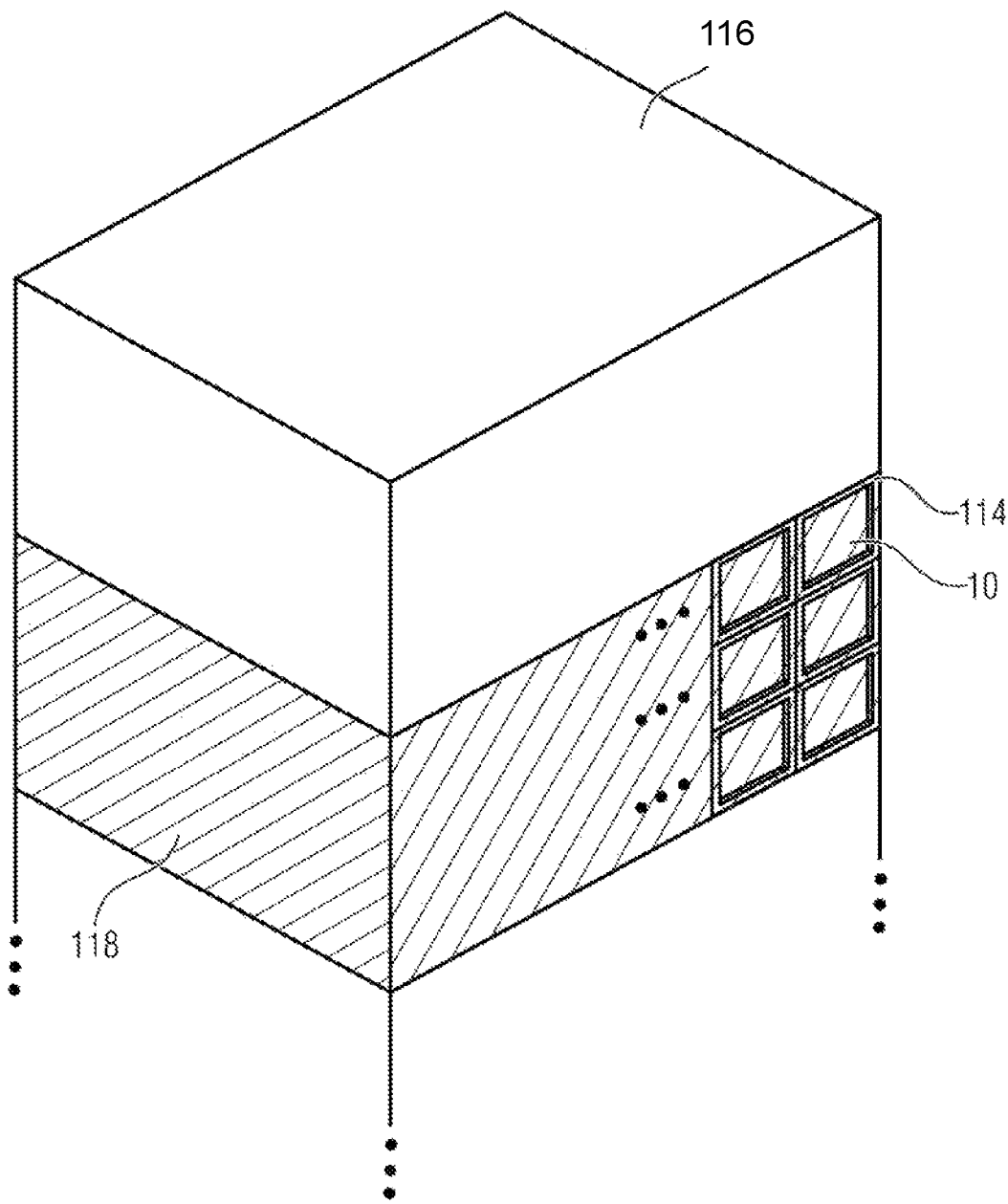
FIG. 19 shows a building façade which is partially provided with a chromatic mirror in accordance with any embodiment of the present application so as to mirror external light and enable a "hiding" of the building façade.

Finally, FIG. 19 shows an embodiment where a building façade, here exemplarily the façade of a skyscraper 116, is provided with one or more chromatic mirrors 10, wherein FIG. 19 illustratively shows merely a portion of the façade as being provided with mirrors 10, namely portion 118. According to this application, the building façade may be made to behave as a piece of sky when it is lit by some directional light, as the light from the sun in a clean day or even in a partially overcast day, thus allowing to substantially modify the appearance of the building and its aesthetical interplay with the surrounding nature and the sky. Although any of the above examples of mirrors 10 may be used to form, at least partially, the façade (with the mirroring side facing outwardly), FIG. 19 illustrates the case that portion 118 is filled by an array of mirrors of the type of FIG. 18. This circumstance shall, however, not be interpreted as excluding any of the other embodiments of mirror 10 to be used for providing portion 118 of the façade with the mirroring effect.

The effect of providing portion 118 of skyscraper 116 with mirror 10 can be further explained as follows: usually sunlight illuminates the façade of skyscrapers 116. Owing to the diffusing property of the diffusing layer of mirror 10, however, an observer looking onto skyscraper 116 will feel as if the sky behind skyscraper 116 would be visible at portion 113 covered by mirror 10. By this measure, the skyscraper 118 may accordingly be almost rendered to disappear at least as far as portion 116 is concerned and this measure may be used for many purposes such as, for example, aesthetic aspects.

Figure 20:
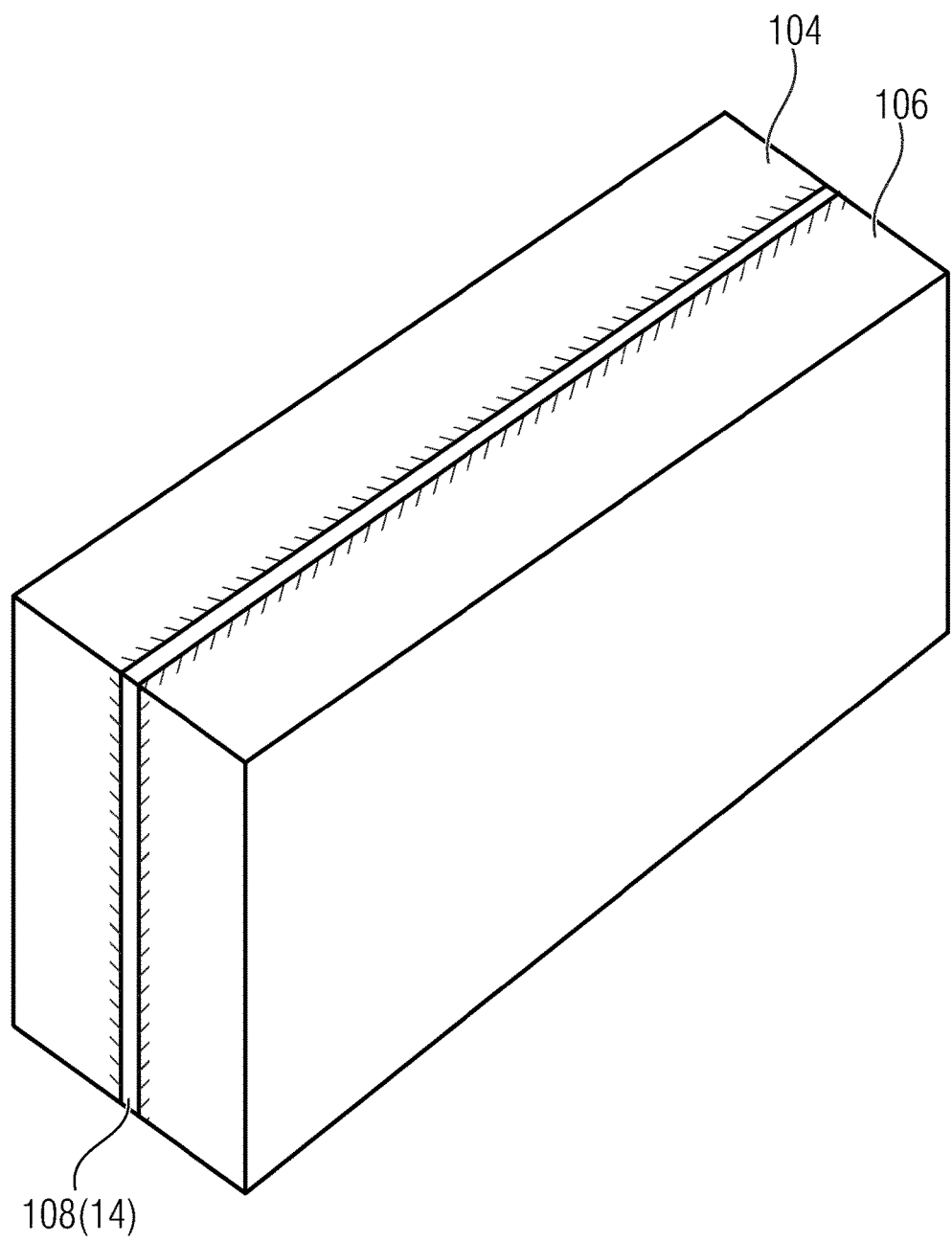
FIG. 20 shows a three-dimensional view of a chromatic panel made on the basis of a stratified-glass panel in accordance with an embodiment.

Finally, FIG. 20 shows an example of a chromatic panel formed as a stratified-glass panel, if differs from FIG. 16 merely in that the coating or film 100 is left off. That is, FIG. 20 shows a chromatic panel which is easily extendable to result in a chromatic mirror according to FIG. 16, and which has the same advantages with respect to its usage within architectural and building environments: it is easily fabricated as there is, in principle, no additional construction step necessary in order to form the stratified-glass panel with layer 100 concurrently assuming the affixation of glass sheets 104 and 106 to each other as well as the wavelength-dependent diffuse scattering functionality. The glass sheets may be of float or tempered glass. Interestingly, within a building, chromatic panel of FIG. 20 may be used both in transmission as well as "in reflection" as far as the half of the diffuse light is concerned, which exits the chromatic component at the same side as the incident light. Thus, when replacing, for example, the mirror 10 at the side wall of FIG. 3 with the chromatic panel of FIG. 20, and illuminating this chromatic panel from the neighboring room to the left of room 48 then an observer standing within room 48 would be able to obtain a sun-sky appearance similar to the one outlined with respect to FIG. 2 with the difference being that the illuminator is positioned in the neighboring room. An observer being within the neighboring room illustrated by dashed lines in FIG. 3, in turn, would see a plane sky without sun. The usage of the chromatic component within a building comprising the two rooms would be of no problem due to the stratified-fiat panel construction.

As to the possibility of construing/fabricating the diffusing layer, reference is made to the above embodiments and in particular the statement made above with respect to FIG. 12.

The invention claimed is:

1. A system for illumination for simulating the illumination of the sky and the sun inside an ambience, the system comprising:
   a chromatic mirror comprising a mirroring surface and a diffusing layer in front of the mirroring surface, which scatters short-wavelength components of impinging light more than long-wavelength components of impinging light, and
   an illuminator configured as a white light source to illuminate the chromatic mirror such that the impinging light passes the diffusing layer twice, once when impinging onto the mirroring surface, and once when heading away from the mirroring surface,
   wherein the diffusing layer comprises a transparent polymer layer having a first dispersion of light-scattering centers of average size smaller than 250 nm embedded therein, thereby scattering light in a Rayleigh regime;
   wherein the chromatic mirror further comprises at least one of:
      a second dispersion of light-scattering centers of average size exactly or greater than 5 times the average size of the light-scattering centers of the first dispersion, the second dispersion being embedded in the transparent polymer layer,
      a lateral variation of a physical thickness of the diffusing layer, and
      a lateral variation of an optical thickness of the diffusing layer,
   such that the chromatic mirror has a reflectance at the specular angle smaller than 50% with respect to the case of comprising only the first dispersion without the lateral variation or the second dispersion.

2. The system of claim 1, wherein the diffusing layer is a coating or a film thinner than 100 µm deposited onto the mirroring surface.

3. The system of claim 1, wherein the mirroring surface is formed by an Al metal mirror foil and the diffusing layer is a coating or a film thinner than 100 µm deposited onto the Al metal mirror.

4. The system of claim 3, wherein the chromatic mirror further comprises
   a protective layer made of a transparent material resistant to external atmospheric agents, and
   wherein the diffusing layer is sandwiched between the Al metal mirror foil and the protective layer.

5. The system of claim 1, wherein the first dispersion of light-scattering centers comprises inorganic nanoparticles of diameter smaller than 250 nm embedded therein that are protected against photo-catalysis induced by near-UV or visible light radiation.

6. The system of claim 1, wherein the mirroring surface is concavely or concavely parabolic shaped.

7. The system of claim 6 further comprising:
   a semitransparent layer positioned downstream the chromatic mirror, wherein the semitransparent layer has regular transmittance in the range 5%-70%, and is configured to absorb less than 20% of the impinging light.

8. The system of claim 6, wherein the chromatic mirror is concavely shaped and the illuminator is positioned at a focus plane of the chromatic mirror so that the light from the illuminator, which is regularly reflected by the chromatic mirror, is parallelized.

9. The system of claim 6, wherein the illuminator and the chromatic mirror are formed in an elongated manner along an elongation axis and the chromatic mirror is concavely shaped in a plane perpendicular to the elongation axis, and
wherein the illuminator has an angular and spatial luminance profile which is broad as far as a luminance profile's dependency on a first angle in a first plane perpendicular to the elongation axis is concerned, thus leading to a light beam with large angular divergence in the first plane, substantially constant as far as a luminance profile's dependency on a coordinate parallel to the elongation direction is concerned, thus leading to a spatially uniform luminance along the elongation direction, and
wherein the illuminator features a narrow peak as far as a luminance profile's dependency on a second angle in a second plane perpendicular to the first plane and containing a direction of maximum luminance of the illuminator is concerned, thus leading a light beam that is substantially collimated in the second plane.

10. The system of claim 9, wherein the illuminator comprises a sequence of pairs of a light emitter and CPC reflector configured to concentrate light emitted by the light emitter as far as an angular divergence of the light beam emitted by the emitter within the second plane is concerned, the pairs being sequentially arranged side by side along the elongation direction.

11. The system of claim 6, further comprising:
a semitransparent layer positioned downstream the chromatic mirror, wherein the semitransparent layer has regular transmittance in the range 10-50%.

12. The system of claim 6, further comprising:
a semitransparent layer positioned downstream the chromatic mirror, wherein the semitransparent layer has regular transmittance in the range 20-40%.

13. The system of claim 6, further comprising:
a semitransparent layer positioned downstream the chromatic mirror, wherein the semitransparent layer is configured as a fabric tent.

14. An array of systems for illumination according to claim 1, wherein the systems for illumination are arranged and configured so that the light which is regularly reflected by the chromatic mirrors forms an array of light beams oriented in the same direction.

15. An interior room of a building for providing therein a sun-sky-appearance, the room having a wall, a ceiling, and a floor, and the room comprising a system of claim 1 for illumination for simulating the illumination of the sky and the sun inside an ambient with a chromatic mirror, and an illuminator.

16. The interior room of claim 15, wherein, during operation of the illuminator, illumination by way of a regularly reflected low-divergence direct light portion of the light generated by illuminator and by way of diffuse light caused by the scattering within the diffusing layer of the chromatic mirror unit is achieved.

17. The interior room of claim 15, wherein the chromatic mirror is fixed to the wall or the ceiling of the room, and the illuminator is positioned within the room or in the wall, the ceiling, or the floor of the room.

18. An architectural object comprising a system for illumination according to claim 1, and
a blocked area that is blocked against human visitors entering the blocked area, and that is arranged so as to be lit by light emitted by the illuminator which illuminates the chromatic mirror and which is reflected by the chromatic mirror without straying.

19. The system of claim 1, wherein the chromatic mirror further comprises a transparent panel and the mirroring surface and the diffusing layer are coatings or films thinner than 100 µm that are deposited onto the same face or onto opposite faces of the transparent panel.

20. The system of claim 1, wherein the mirroring surface has a focal length which is more than one time smaller than a square root of the mirroring surface's area.

21. The system of claim 1, wherein the mirroring surface has a focal length which is more than four times smaller than a square root of the mirroring surface's area.

22. A system for illumination for simulating the illumination of the sky and the sun inside an ambience, the system comprising:
a chromatic mirror comprising a mirroring surface and a diffusing layer in front of the mirroring surface, which scatters short-wavelength components of impinging light more than long-wavelength components of impinging light, and
an illuminator configured as a white light source to illuminate the chromatic mirror such that the impinging light passes the diffusing layer twice, once when impinging onto the mirroring surface, and once when heading away from the mirroring surface,
wherein the diffusing layer comprises a transparent polymer layer having a first dispersion of light-scattering centers of average size smaller than 250 nm embedded therein, thereby scattering light in a Rayleigh regime,
wherein the chromatic mirror further comprises a diffusing panel which comprises two glass sheets with the diffusing layer sandwiched in between as an adhesive transparent polymeric film with the first dispersion of light-scattering centers of size smaller than 250 nm embedded therein.

23. A system for illumination for simulating the illumination of the sky and the sun inside an ambience, the system comprising:
a chromatic mirror comprising a mirroring surface and a diffusing layer in front of the mirroring surface, which scatters short-wavelength components of impinging light more than long-wavelength components of impinging light, and
an illuminator configured as a white light source to illuminate the chromatic mirror such that the impinging light passes the diffusing layer twice, once when impinging onto the mirroring surface, and once when heading away from the mirroring surface,
wherein the diffusing layer comprises a transparent polymer layer having a first dispersion of light-scattering centers of average size smaller than 250 nm embedded therein, thereby scattering light in a Rayleigh regime,
wherein the diffusing layer is placed immediately in front of the mirroring surface and is configured not to substantially change the chromatic property of the resulting chromatic short- and long-wavelength components such that light regularly reflected by the chromatic mirror maintains the initial solid-angle luminance profile of the light with merely the spectrum of the light being affected by the wavelength-selective scattering property of the diffusing layer, and that, by passing the diffusing layer twice, the short-wavelength component of the impinging light maintains the luminance profile of the light despite the interposition of the mirroring surface because the same is diffuse, or widened compared to the regularly reflected light rays.

24. A system for illumination for simulating the illumination of the sky and the sun inside an ambience, the system comprising:
- a chromatic mirror comprising a mirroring surface and a diffusing layer in front of the mirroring surface, which scatters short-wavelength components of impinging light more than long-wavelength components of impinging light, and
- an illuminator configured as a white light source to illuminate the chromatic mirror such that the impinging light passes the diffusing layer twice, once when impinging onto the mirroring surface, and once when heading away from the mirroring surface,
- wherein the diffusing layer comprises a transparent polymer layer having a first dispersion of light-scattering centers of average size smaller than 250 nm embedded therein, thereby scattering light in a Rayleigh regime,
- wherein the chromatic mirror further comprises a further transparent polymer layer, wherein the further transparent polymer layer is characterized by at least one of:
  - a second dispersion of light-scattering centers of average size exactly or greater than 5 times the average size of the light-scattering centers of the first dispersion embedded in the further transparent polymer layer,
  - a lateral variation of a physical thickness of the further transparent layer, and
  - a lateral variation of an optical thickness of the further transparent layer,
- such that the chromatic mirror has a reflectance at the specular angle smaller than 50% with respect to the case of comprising only the first dispersion without the further transparent polymer layer.

25. A chromatic mirror for a white light source based illumination system, the chromatic mirror comprising
- a mirroring surface formed by a coating, a film, or a panel, and
- a diffusing layer in front of the mirroring surface, which preferentially scatters short-wavelength components of impinging white light with respect to long-wavelength components of impinging white light, the diffusing layer comprising
- a first dispersion of light-scattering centers of average size smaller than 250 nm, and
- a transparent polymer layer having the first dispersion of light-scattering centers embedded therein, thereby scattering light in a Rayleigh regime, and
- wherein the chromatic mirror comprises at least one of:
  - a second dispersion of light-scattering centers of average size exactly or greater than 5 times the average size of the light-scattering centers of the first dispersion and having a size larger than 1 µm, the second dispersion being embedded in the transparent polymer layer or in a further transparent polymer layer, and
  - a lateral variation of at least one of:
    - a physical thickness of the diffusing layer,
    - an optical thickness of the diffusing layer,
    - a physical thickness of a further transparent layer of the chromatic mirror, and
    - an optical thickness of the further transparent layer of the chromatic mirror,
- wherein the lateral variation includes a thickness modulation with an average spatial frequency in the range of 10-200 modulations/mm, and a ratio between the depth and the transverse size of the thickness modulation in the range 0.05-2.0,
  - such that the chromatic mirror has a reflectance for white light at the specular angle smaller than 50% with respect to the case of comprising only the first dispersion without the layer of varying thickness or the second dispersion.

26. The chromatic mirror according to claim 25, wherein the mirroring surface and the diffusing layer are configured to:
- produce, in combination, a haze in reflection that is >10% for impinging blue light at 450 nm; or
- produce a haze in reflection that is at least 2 times lower for an impinging red light at 650 nm than for an impinging blue light at 450 nm.

27. The chromatic mirror according to claim 25, wherein:
- the layer of varying thickness is configured such that light, which crosses the layer of varying thickness in the inward direction and is reflected by the mirroring surface and crosses again the layer of varying thickness in the outward direction experiences a low-angle diffusion, and
- red-light rays at 650 nm, which cross the layer of varying thickness in the inward direction and are reflected by the mirroring surface and cross again the layer of varying thickness in the outward direction, have, assuming a spatial even probability of incidence, at least 50% of probability of experiencing an angular deviation in the range 0.1°-20° from the direction of specular reflection; and
- the layer of varying thickness is configured so that said chromatic mirror has a reflectance <25% with respect to the case of a mirroring surface without the layer of varying thickness; and
- the diffuse reflectance of the chromatic mirror is >50%.

28. The chromatic mirror according to claim 25, wherein the diffusing layer is a coating or a film thinner than 100 µm deposited onto the mirroring surface.

29. The chromatic mirror according to claim 25, further comprising a transparent panel and the mirroring surface and the diffusing layer are coatings or films thinner than 100 µm that are deposited onto the transparent panel.

30. The chromatic mirror according to claim 25, further comprising a stratified-glass panel that comprises two glass sheets sandwiching an adhesive transparent polymeric film, wherein:
- facets of the two glass sheets facing the adhesive polymeric film form glass tin sides of the two glass sheets,
- the mirroring surface is a first coating or a film deposited onto an air side of one of the two glass sheets; and
- the diffusing layer is a second coating or a film deposited onto an air side of the other of the two glass sheets.

31. The chromatic mirror according to claim 25, further comprising a diffusing panel that comprises two glass sheets with the diffusing layer sandwiched in between as an adhesive transparent polymeric film with the first dispersion of light-scattering centers of size smaller than 250 nm embedded therein.

32. The chromatic mirror according to claim 25, wherein the mirroring surface is formed by an Al metal mirror foil and the diffusing layer is a coating or a film thinner than 100 µm deposited onto the Al metal mirror.

33. The chromatic mirror according to claim 32, further comprising a protective layer made of a transparent material resistant to external atmospheric agents, wherein the diffusing layer is sandwiched between the Al metal mirror foil and the protective layer.

34. The chromatic mirror according to claim 25, wherein the first dispersion of light-scattering centers comprises inorganic nanoparticles of diameter smaller than 250 nm embedded therein that are protected against photo-catalysis induced by near-UV and/or visible light radiation.

35. The chromatic mirror according to claim 25, wherein:
the mirroring surface is concavely shaped, and
the mirroring surface has a focal length that is more than one time smaller a square root of the mirroring surface's area.

36. A system for illumination comprising:
a chromatic mirror according to claim 25, and
an illuminator configured as a white light source to illuminate the chromatic mirror.

37. The system for illumination according to claim 36, further comprising:
a semitransparent layer positioned downstream the chromatic mirror, wherein the semitransparent layer has regular transmittance in the range 5%-70%.

38. The system for illumination according to claim 36, wherein the chromatic mirror is concavely shaped and the illuminator is positioned at a focus plane of the chromatic mirror so that the light from the illuminator, which is regularly reflected by the chromatic mirror, is parallelized.

39. The system for illumination according to claim 36, wherein:
the illuminator and the chromatic mirror are formed in an elongated manner along an elongation axis (x) and the chromatic mirror is concavely shaped in a plane perpendicular to the elongation axis,
the illuminator has an angular and spatial luminance profile that is broad as far as a luminance profile's dependency on a first angle in a first plane perpendicular to the elongation axis is concerned, thus leading to a light beam with large angular divergence in the first plane, substantially constant as far as a luminance profile's dependency on a coordinate parallel to the elongation direction is concerned, thus leading to a spatially uniform luminance along the elongation direction,
the illuminator features a narrow peak as far as a luminance profile's dependency on a second angle in a second plane perpendicular to the first plane and containing a direction of maximum luminance of the illuminator is concerned, thus leading a light beam that is substantially collimated in the second plane.

40. The system for illumination according to claim 36, wherein the illuminator comprises a sequence of pairs of a light emitter and a compound parabolic concentrator reflector configured to concentrate light emitted by the light emitter as far as an angular divergence of the light beam emitted by the emitter within the second plane is concerned, the pairs being sequentially arranged side by side along the elongation direction.

41. An array of systems for illumination according to claim 36, wherein the systems for illumination are arranged and configured so that the light that is regularly reflected by the chromatic mirrors forms an array of light beams oriented in the same direction.

42. An interior room of a building for providing therein a sun-sky-appearance, the room having a wall, a ceiling, and a floor, and the room comprising:
a chromatic mirror according to claim 25, and
an illuminator configured to illuminate the chromatic mirror,
wherein the chromatic mirror is fixed to the wall or the ceiling of the room and the illuminator is positioned within the room or in the wall, the ceiling or the floor of the room.

43. The interior room of claim 42, wherein, during operation of the illuminator, illumination by way of a regularly reflected low-divergence direct light portion of the light generated by illuminator and by way of diffuse light caused by the scattering within the diffusing layer of the chromatic mirror unit is achieved.

44. A system for illumination for simulating the illumination of the sky and the sun inside an ambience, the system comprising:
a chromatic mirror comprising a mirroring surface and a diffusing layer in front of the mirroring surface, which scatters short-wavelength components of impinging light more than long-wavelength components of impinging light, and
an illuminator configured as a white light source to illuminate the chromatic mirror such that the impinging light passes the diffusing layer twice, once when impinging onto the mirroring surface, and once when heading away from the mirroring surface,
wherein the diffusing layer comprises a transparent polymer layer having a first dispersion of light-scattering centers of average size smaller than 250 nm embedded therein, thereby scattering light in a Rayleigh regime,
wherein the chromatic mirror further comprises a stratified-glass panel which comprises two float glass sheets sandwiching an adhesive transparent polymeric film, wherein the faces of the two glass sheets facing the adhesive polymeric film form glass tin sides of the two glass sheets, and wherein the mirroring surface is a first coating or a film deposited onto an air side of one of the two glass sheets and wherein the diffusing layer is a second coating or a film deposited onto an air side of the other of the two glass sheets.

* * * * *

UNITED STATES PATENT AND TRADEMARK OFFICE
CERTIFICATE OF CORRECTION

PATENT NO. : 10,161,596 B2
APPLICATION NO. : 15/310306
DATED : December 25, 2018
INVENTOR(S) : Paolo Di Trapani It is certified that error appears in the above-identified patent and that said Letters Patent is hereby corrected as shown below:

On the Title Page

Item (86) should read:
--(86) PCT No.: PCT/EP2014/059802
§ 371 (c)(1),
(2) Date: Nov. 10, 2016--

Signed and Sealed this
Tenth Day of March, 2020

Andrei Iancu
*Director of the United States Patent and Trademark Office*